(12) United States Patent
Panikkar et al.

(10) Patent No.: US 12,164,869 B2
(45) Date of Patent: Dec. 10, 2024

(54) AUTOMATED DOCUMENT PARSING TO DETERMINE COMMON COMPONENT IDENTIFIERS FOR CONSOLIDATION OF COMPONENT ORDERS

(71) Applicant: Dell Products L.P., Round Rock, TX (US)

(72) Inventors: Shibi Panikkar, Bangalore (IN); Rohit Gosain, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 301 days.

(21) Appl. No.: 17/726,828

(22) Filed: Apr. 22, 2022

(65) Prior Publication Data

US 2023/0342542 A1 Oct. 26, 2023

(51) Int. Cl.
*G06F 40/205* (2020.01)
*G06F 40/284* (2020.01)
(Continued)

(52) U.S. Cl.
CPC .......... *G06F 40/205* (2020.01); *G06F 40/284* (2020.01); *G06F 40/40* (2020.01); *G06Q 10/087* (2013.01)

(58) Field of Classification Search
CPC .... G06F 16/2264; G06F 16/283; G06F 16/30; G06F 16/335; G06F 16/9535;
(Continued)

(56) References Cited

U.S. PATENT DOCUMENTS

| | | | | |
|---|---|---|---|---|
| 7,860,872 B2* | 12/2010 | Serjeantson | .......... | G06F 40/205 |
| | | | | 707/811 |
| 8,577,670 B2* | 11/2013 | Wang | .................... | G06F 40/284 |
| | | | | 704/255 |

(Continued)

OTHER PUBLICATIONS

Wikipedia, "Enterprise Resource Planning," https://en.wikipedia.org/w/index.php?title=Enterprise_resource_planning&oldid=1084029051, Apr. 22, 2022, 22 pages.
(Continued)

*Primary Examiner* — Gerald Gauthier
(74) *Attorney, Agent, or Firm* — Ryan, Mason & Lewis, LLP

(57) ABSTRACT

An apparatus comprises a processing device configured to generate and utilize an automated document parser for parsing documents exchanged as part of fulfillment of historical component orders by a given supplier in a supply chain for first and second organizations to identify first and second organization-specific component identifiers utilized by the first and second organizations and a given supplier-specific component identifier utilized by the given supplier for a given component. The processing device is further configured to determine a common component identifier for the given component based at least in part on mapping an association between the first and second organization-specific component identifiers, to consolidate first and second component orders by the first and second organizations that utilize the first and second organization-specific component identifiers into an aggregated component order that utilizes the common component identifier, and to process the aggregated component order utilizing suppliers in the supply chain.

20 Claims, 23 Drawing Sheets

(51) Int. Cl.
*G06F 40/40* (2020.01)
*G06Q 10/087* (2023.01)

(58) Field of Classification Search
CPC .... G06F 40/205; G06F 40/263; G06F 40/284; G06F 40/295; G06F 40/30; G06F 40/40; G06F 11/3684; G06F 16/3344; G06F 16/36; G06F 16/90332; G06F 16/972; G06F 40/134; G06N 3/08; G06Q 10/06; G06Q 10/06315; G06Q 10/0833; G06Q 10/087; G06Q 10/0875; G06Q 10/101; G06Q 20/20; G06Q 30/018; G06Q 30/0611; G06Q 30/0635; G06Q 50/04; G06V 30/412; G06V 30/416; G08N 20/00; G10L 15/1822; G10L 19/018
See application file for complete search history.

(56) References Cited

U.S. PATENT DOCUMENTS

| | | | | |
|---|---|---|---|---|
| 8,892,419 | B2* | 11/2014 | Lundberg | G06F 16/972 704/8 |
| 8,935,654 | B2* | 1/2015 | Sengupta | G06F 11/3684 717/124 |
| 8,996,376 | B2* | 3/2015 | Fleizach | G10L 19/018 704/235 |
| 11,620,453 | B2* | 4/2023 | Lockett | G06N 3/08 704/9 |
| 11,645,457 | B2* | 5/2023 | Andrews | G06F 40/134 704/9 |
| 11,688,022 | B2* | 6/2023 | Aghajanyan | G06F 16/90332 704/9 |
| 11,694,018 | B2* | 7/2023 | Lundin | G06F 40/284 704/9 |
| 11,775,767 | B1* | 10/2023 | Liu | G06F 16/3344 704/9 |
| 11,783,815 | B2* | 10/2023 | Greborio | G10L 15/1822 704/9 |
| 2003/0040923 | A1* | 2/2003 | Dietz | G06Q 30/018 705/1.1 |
| 2007/0094239 | A1* | 4/2007 | Catucci | G06Q 10/087 |
| 2007/0187474 | A1* | 8/2007 | Blackshear | G06Q 10/06 705/28 |
| 2008/0183710 | A1* | 7/2008 | Serjeantson | G06F 16/30 |
| 2009/0254583 | A1* | 10/2009 | Kenney | G06F 16/283 707/999.102 |
| 2010/0235313 | A1* | 9/2010 | Rea | G06F 16/335 706/54 |
| 2013/0132296 | A1* | 5/2013 | Koppenhagen | G06Q 10/101 705/342 |
| 2015/0081277 | A1* | 3/2015 | Behi | G06F 40/205 704/9 |
| 2015/0120486 | A1* | 4/2015 | Haidet | G06Q 30/0611 705/26.4 |
| 2015/0347385 | A1* | 12/2015 | Flor | G06F 40/284 704/9 |
| 2015/0363388 | A1* | 12/2015 | Herdagdelen | G06F 40/263 704/9 |
| 2016/0358110 | A1* | 12/2016 | Knipfer | G06F 16/9535 |
| 2020/0057754 | A1* | 2/2020 | Willcock | G06F 16/2264 |
| 2021/0065150 | A1* | 3/2021 | Mathew | G06Q 20/20 |
| 2021/0174298 | A1* | 6/2021 | Yin | G06Q 30/0635 |
| 2022/0083076 | A1* | 3/2022 | Rakshit | G06Q 10/06315 |
| 2022/0100967 | A1* | 3/2022 | Pushkin | G06F 40/30 |
| 2022/0207449 | A1* | 6/2022 | Cooks | G06Q 10/0833 |
| 2023/0132072 | A1* | 4/2023 | Tunstall-Pedoe | G06F 16/36 704/9 |
| 2023/0135819 | A1* | 5/2023 | Sharma | G06N 20/00 704/9 |
| 2023/0230002 | A1* | 7/2023 | Panikkar | G06Q 10/087 705/7.25 |
| 2023/0252379 | A1* | 8/2023 | Barford | G06Q 50/04 705/7.25 |
| 2023/0342542 | A1* | 10/2023 | Panikkar | G06V 30/416 |

OTHER PUBLICATIONS

Wikipedia, "Supply Chain Management," https://en.wikipedia.org/w/index.php?title=Supply_chain_management&oldid=1083282625, Apr. 18, 2022, 14 pages.

Wikipedia, "Parsing," https://en.wikipedia.org/w/index.php?title=Parsing&oldid=1076332498, Mar. 10, 2022, 10 pages.

* cited by examiner

*700*

| | COMPONENT/ PARTS INVOICE |
|---|---|

SUPPLIER 1 (SUP1)

ORGANIZATION 1 (ORG1)

INVOICE #: [NUMBER]     DATE: [DATE]

BILL TO: [ADDRESS 1]     SHIP TO: [ADDRESS 2]

*701*

| SUP1 ID | ORG1 ID | DESCRIPTION | QUANTITY | $/UNIT | AMOUNT ($) |
|---|---|---|---|---|---|
| ABCD | 1234 | DESCRIPTION 1 | 18976 | 1.23 | XXXXX |
| EFGH | 2345 | DESCRIPTION 2 | 78875 | 8.21 | XXXXX |
| HIJKL | 3456 | DESCRIPTION 3 | 97675 | 2.34 | XXXXX |
| LMNO | 4567 | DESCRIPTION 4 | 7865 | 3.23 | XXXXX |
| ... | ... | ... | ... | ... | ... |

[COMMENTS OR SPECIAL INSTRUCTIONS]

PAYMENT IS DUE WITHIN [NUMBER] DAYS

SUBTOTAL: XXXXX
DISCOUNT: XXXXX
SHIPPING: XXXXX
TAX: XXXXX
TOTAL: XXXXX

| SUPPLIER 1 (SUP1) | | | | COMPONENT/ PARTS INVOICE | |
|---|---|---|---|---|---|
| ORGANIZATION 2 (ORG2) | | | | | |

INVOICE #: [NUMBER]　　　　　DATE: [DATE]

BILL TO:　　　　　　　　　　　SHIP TO:
[ADDRESS 1]　　　　　　　　　[ADDRESS 2]

706

| SUP1 ID | ORG2 ID | DESCRIPTION | QUANTITY | $/UNIT | AMOUNT ($) |
|---|---|---|---|---|---|
| ABCD | 9876 | DESCRIPTION 1 | 34583 | 1.23 | XXXXX |
| QUER | 8765 | DESCRIPTION 2 | 7865 | 8.21 | XXXXX |
| JFHJF | 7654 | DESCRIPTION 3 | 5453 | 2.34 | XXXXX |
| EFGH | 6543 | DESCRIPTION 4 | 23476 | 3.23 | XXXXX |
| ... | ... | ... | ... | ... | ... |

[COMMENTS OR SPECIAL INSTRUCTIONS]

SUBTOTAL: XXXXX
DISCOUNT: XXXXX
SHIPPING: XXXXX
TAX:　　　 XXXXX
TOTAL:　  XXXXX

PAYMENT IS DUE WITHIN [NUMBER] DAYS

FIG. 7B

COMPONENT/PARTS INVOICE

SUPPLIER 1 (SUP1)

ORGANIZATION 1 (ORG1)

INVOICE #: [NUMBER]  DATE: [DATE]

BILL TO: [ADDRESS 1]  SHIP TO: [ADDRESS 2]

| SUP1 ID | ORG1 ID | DESCRIPTION | QUANTITY | $/UNIT | AMOUNT ($) |
|---|---|---|---|---|---|
| ABCD | 1234 | DESCRIPTION 1 | 18976 | 1.23 | XXXXX |
| EFGH | 2345 | DESCRIPTION 2 | 78875 | 8.21 | XXXXX |
| HIJKL | 3456 | DESCRIPTION 3 | 97675 | 2.34 | XXXXX |
| LMNO | 4567 | DESCRIPTION 4 | 7865 | 3.23 | XXXXX |
| ... | ... | ... | ... | ... | ... |

[COMMENTS OR SPECIAL INSTRUCTIONS]

SUBTOTAL: XXXXX
DISCOUNT: XXXXX
SHIPPING: XXXXX
TAX: XXXXX
TOTAL: XXXXX

PAYMENT IS DUE WITHIN [NUMBER] DAYS

```
{
    "SupplierName" : "SUP1"
    "InvoiceType" : "Component Invoice",
    "InvoiceLayout" : "Portrait", "SupplierComponent" : "Gray",
    "SupplierRepeatDirection" : "Down",
    "SupplierRepeatTill" : "No_Pattern_Found",
    "SupplierPadding" : "<Learn>", "BuyerComponent" : "Black",
    "BuyerRepeatDirection" : "Down",
    "BuyerRepeatTill" : "No_Pattern_Found",
    "BuyerPadding" : "<Learn>",
    "RelativePositionToSupplier" : "Right"
}
```

FIG. 8

```
import cv2
import matplotlib.pyplot as plt image= cv2.imread(Invoice Sample Supplier 1.png')
original_image= image gray= cv2.cvtColor(image,cv2.COLOR_GRAY)

edges= cv2.Canny(gray, 50,200)

contours, hierarchy= cv2.findContours(edges.copy(), cv2.RETR_EXTERNAL,
cv2.CHAIN_APPROX_NONE)

sorted_contours= sorted(contours, key=cv2.contourArea, reverse= False)

component_Image= sorted_contours[0]

x,y,w,h= cv2.boundingRect(component_Image )
x = x
x1 = x+w
y = y
y1 = y+h
```

```
import cv2 image = cv2.imread(' Invoice Sample Supplier 1.png', 0)
thresh = 255 - cv2.threshold(image, 0, 255, cv2.THRESH_BINARY_INV +
cv2.THRESH_OTSU)[1]

ROI = thresh[y:y1h,x:x1] (ROI – Rectangle of Interest)
```

1010

```
import pytesseract
  data = pytesseract.image_to_string(ROI, lang='eng',config='--psm 6')
```

FIG. 10B

| SUPPLIER | INITIAL SUPPLIER COMPONENT ID COORDINATES | INITIAL BUYER (ORGANIZATION) COMPONENT ID COORDINATES | PADDING FOR NEXT LINE | CONFIGURATION FILE PATH |
|---|---|---|---|---|
| SUPPLIER 1 | 2,10,4,12 | 8,16,10,18 | 8 | //path |
| SUPPLIER 2 | 4,13,4,15 | 10,17,7,16 | 9 | //path |
| ... | ... | ... | ... | ... |

AUTOMATED DOCUMENT PARSING TO DETERMINE COMMON COMPONENT IDENTIFIERS FOR CONSOLIDATION OF COMPONENT ORDERS

FIELD

The field relates generally to information processing, and more particularly to supply chain management in information processing systems.

BACKGROUND

A supply chain may include a plurality of suppliers. In some cases, a first one of the plurality of suppliers may offer at least some of the same parts or components as at least a second one of the plurality of suppliers. A particular organization may place orders for a particular part or component with both the first and second ones of the plurality of suppliers. This may be done for various reasons, such as that organization needing a quantity of that part or component which cannot be fulfilled by either the first or second one of the plurality of suppliers individually, to prevent any individual one of the plurality of suppliers from gaining a monopoly for that part or component, etc. Further, a particular supplier may receive multiple orders for the same part or component from multiple different organizations.

SUMMARY

Illustrative embodiments of the present disclosure provide techniques for automated document parsing to determine common component identifiers for consolidation of component orders from multiple organizations.

In one embodiment, an apparatus comprises at least one processing device comprising a processor coupled to a memory. The at least one processing device is configured to perform the step of generating an automated document parser for documents exchanged as part of fulfillment of historical component orders for one or more components by a given one of a plurality of suppliers in a supply chain, the historical component orders being fulfilled for first and at least second organizations that utilize the given supplier. The at least one processing device is also configured to perform the step of parsing, utilizing the automated document parser, the documents exchanged as part of the fulfillment of the historical component orders for the one or more components by the given supplier to identify (i) a first organization-specific component identifier utilized by the first organization for a given one of the one or more components, (ii) a second organization-specific component identifier utilized by the second organization for the given component, and (iii) a given supplier-specific component identifier utilized by the given supplier for the given component. The at least one processing device is further configured to perform the steps of determining a common component identifier for the given component based at least in part on mapping an association between the first organization-specific component identifier and the second organization-specific component identifier, consolidating a first component order by the first organization that utilizes the first organization-specific component identifier for the given component and a second component order by the second organization that utilizes the second organization-specific component identifier for the given component into an aggregated component order that utilizes the common component identifier for the given component, and processing the aggregated component order utilizing one or more of the plurality of suppliers in the supply chain.

These and other illustrative embodiments include, without limitation, methods, apparatus, networks, systems and processor-readable storage media.

BRIEF DESCRIPTION OF THE DRAWINGS

FIGS. 7A-7C show sample component invoices in an illustrative embodiment.

FIG. 8 shows pseudocode for identifying rectangles within an invoice document in an illustrative embodiment.

FIGS. 10A and 10B show pseudocode for reading coordinates from invoice documents, extracting images from specific coordinates, and for reading data from the extracted images in an illustrative embodiment.

FIGS. 11A-11D show an example of learning the padding between coordinates of different rectangles in invoice documents in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
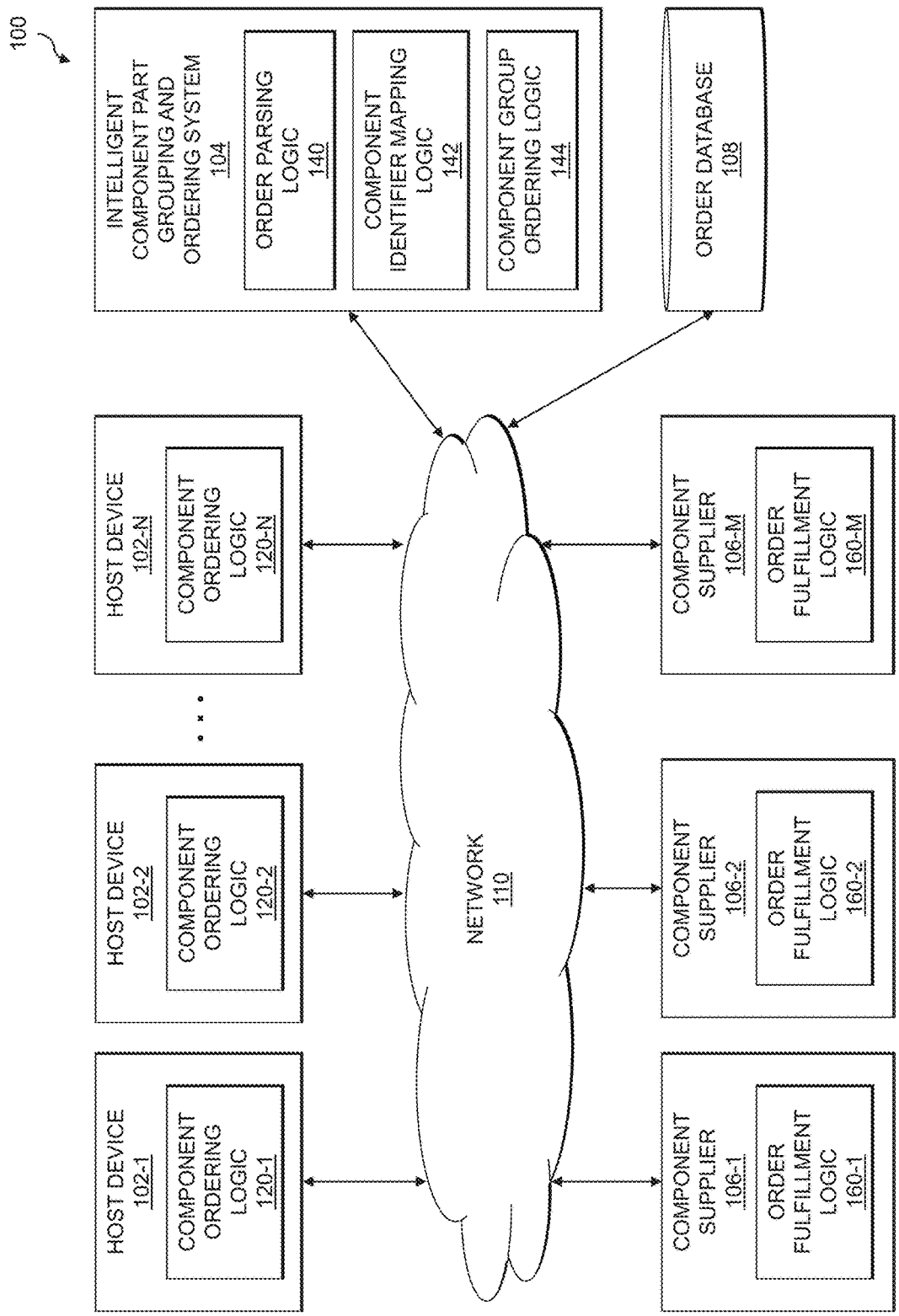
FIG. 1 is a block diagram of an information processing system configured for automated document parsing to determine common component identifiers for consolidation of component orders from multiple organizations in an illustrative embodiment.

FIG. 1 shows an information processing system 100 configured in accordance with an illustrative embodiment. The information processing system 100 is assumed to be built on at least one processing platform and provides functionality for automated document parsing to determine common component identifiers for consolidation of component orders from multiple organizations. The information processing system 100 includes a set of host devices 102-1, 102-2, . . . 102-N (collectively, host devices 102) and a set of component suppliers 106-1, 106-2, . . . 106-M (collectively, component suppliers 106) which are coupled to a network 110. The host devices 102 utilize respective instances of component ordering logic 120-1, 120-2, . . . 120-N (collectively, component ordering logic 120) to submit orders for different components (e.g., hardware and/or software components of one or more physical or virtual computing resources) to the component suppliers 106. The different host devices 102 may be associated, for example, with different entities or other organizations that utilize different part numbers or component identifiers for the same components. The component suppliers 106 utilize respective instances of order fulfillment logic 160-1, 160-2, . . . 160-M (collectively, order fulfillment logic 160) for fulfilling the orders submitted by the host devices 102. Also coupled to the network 110 is an intelligent component part grouping and ordering system 104 and an order database 108.

The intelligent component part grouping and ordering system 104 is assumed to analyze historical orders that are stored in an order database 108 to identify common components in such historical orders (e.g., such as where different ones of the host devices 102 utilize different part numbers or component identifiers for the same components), and to intelligently group subsequent orders submitted by the host devices 102 for fulfillment by the component suppliers 106. To do so, the intelligent component part grouping and ordering system 104 utilizes order parsing logic 140, component identifier mapping logic 142, and component group ordering logic 144. The order parsing logic 140 is configured to generate automated document parsers for use in parsing documents that are exchanged between the host devices 102 and the component suppliers 106 as part of fulfillment of historical component orders (e.g., stored in the order database 108). The order parsing logic 140 is further configured to utilize the automated document parsers to parse such documents to identify organization-specific component identifiers utilized by different organizations (e.g., associated with different ones of the host devices 102) and supplier-specific component identifiers utilized by different ones of the component suppliers 106 for the same or similar components. The component identifier mapping logic 142 is configured to determine common component identifiers for different components, based on mapping associations between different organization-specific component identifiers (e.g., by matching the different organization-specific component identifiers to a same supplier-specific component identifier).

The component group ordering logic 144 is configured to consolidate subsequent component orders by different organizations (e.g., associated with different ones of the host devices) that utilize different organization-specific component identifiers for the same components into aggregated component orders that utilize the common component identifiers. The aggregated component orders are then processed utilizing the component suppliers 106. It should be noted that "processing" of an aggregated component order may include the intelligent component part grouping and ordering system 104 directly (e.g., by submitting the aggregated component order to one or more of the component suppliers 106) or indirectly (e.g., by returning the aggregated component order to one of the source host devices 102, where that host device directly submits the aggregated component order to one or more of the component suppliers 106). Processing of an aggregated component order may also include various other actions, such as: negotiation with one or more of the component suppliers 106 (e.g., for volume discounts or better prices for components); directing distribution of components from the component suppliers to different source organizations whose component orders were consolidated into the aggregate component order; etc.

The host devices 102 may comprise, for example, physical computing devices such as mobile telephones, laptop computers, tablet computers, desktop computers, Internet of Things (IoT) devices, or other types of devices. Such devices are examples of what are more generally referred to herein as "processing devices." Some of these processing devices are also generally referred to herein as "computers." The host devices in some cases may also or alternatively comprise virtualized computing resources, such as virtual machines (VMs), software containers, etc. The component suppliers 106 may similarly comprise processing devices and/or virtualized computing resources.

The host devices 102, as noted above, may in some embodiments comprise respective computers associated with different companies, entities, enterprises or other organizations. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 110 is assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

In some embodiments, one or more of the host devices 102 provide at least a portion of an information technology (IT) infrastructure operated by one or more enterprises or other organizations. The IT infrastructure comprising at least a subset of the host devices 102 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the host devices 102. A given enterprise system may host assets that are associated with multiple enterprises (e.g., two or more different businesses, entities or other organizations). For example, in some cases different ones of the host devices 102 are associated with different enterprises (e.g., different customers or end-users) which purchase components from another enterprise (e.g., the component suppliers 106). The intelligent component part grouping and ordering system 104 may be associated with a same or a different enterprise than the enterprise that operates at least a subset of the host devices 102.

The order database 108, as discussed above, is configured to store and record various information that is used by the intelligent component part grouping and ordering system 104. Such information may include, but is not limited to: historical orders; order or invoice formats; part numbers or component identifiers (IDs) utilized by different ones of the host devices 102 (e.g., different organizations) and/or different ones of the component suppliers 106; common part number or component identifier groups (e.g., multiple part numbers or component IDs that refer to the same component), etc. The order database 108 in some embodiments is implemented using one or more storage systems or devices associated with the intelligent component part grouping and ordering system 104. In some embodiments, one or more of the storage systems utilized to implement the order database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the host devices 102, the intelligent component part grouping and ordering system 104, the component suppliers 106 and the order database 108, as well as to support communication therebetween and with other related systems and devices not explicitly shown.

Although shown in the FIG. 1 embodiment as being separate from the host devices 102 (e.g., as a stand-alone server, set of servers or other type of system coupled via the network 110 to the host devices 102), the intelligent component part grouping and ordering system 104 or at least portions thereof (e.g., one or more of the order parsing logic 140, the component identifier mapping logic 142 and the component group ordering logic 144) may in other embodiments be implemented at least in part internally to one or more of the host devices 102.

The host devices 102, the intelligent component part grouping and ordering system 104, and the component suppliers 106 in the FIG. 1 embodiment are assumed to be implemented using at least one processing device. Each such processing device generally comprises at least one processor and an associated memory, and implements at least a portion of the functionality of one or more of the component ordering logic 120, the order parsing logic 140, the component identifier mapping logic 142, the component group ordering logic 144 and the order fulfillment logic 160.

It is to be appreciated that the particular arrangement of the host devices 102, the intelligent component part grouping and ordering system 104, the component suppliers 106 and the order database 108 illustrated in the FIG. 1 embodiment is presented by way of example only, and alternative arrangements can be used in other embodiments. As discussed above, for example, the intelligent component part grouping and ordering system 104 may in some cases be implemented at least in part internal to one or more of the host devices 102. At least portions of the component ordering logic 120, the order parsing logic 140, the component identifier mapping logic 142, the component group ordering logic 144 and the order fulfillment logic 160 may be implemented at least in part in the form of software that is stored in memory and executed by a processor.

It is to be understood that the particular set of elements shown in FIG. 1 for automated document parsing to determine common component identifiers for consolidation of component orders from multiple organizations is presented by way of illustrative example only, and in other embodiments additional or alternative elements may be used. Thus, another embodiment may include additional or alternative systems, devices and other network entities, as well as different arrangements of modules and other components.

The host devices 102, the intelligent component part grouping and ordering system 104, the component suppliers 106, the order database 108 and other portions of the system 100, as will be described above and in further detail below, may be part of cloud infrastructure.

The host devices 102, the intelligent component part grouping and ordering system 104, the component suppliers 106, the order database 108 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The host devices 102, the intelligent component part grouping and ordering system 104, the component suppliers 106, the order database 108, or components thereof, may be implemented on respective distinct processing platforms, although numerous other arrangements are possible. For example, in some embodiments at least portions of two or more of the host devices 102, the intelligent component part grouping and ordering system 104, the component suppliers 106, and the order database 108, or components thereof, are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102, the intelligent component part grouping and ordering system 104, the component suppliers 106, and the order database 108, or portions or components thereof, to reside in different data centers. Numerous other distributed implementations are possible.

Additional examples of processing platforms utilized to implement the host devices 102, the intelligent component part grouping and ordering system 104, the component suppliers 106, the order database 108, and other components of the system 100 in illustrative embodiments will be described in more detail below in conjunction with FIGS. 13 and 14.

It is to be appreciated that these and other features of illustrative embodiments are presented by way of example only, and should not be construed as limiting in any way.

An exemplary process for automated document parsing to determine common component identifiers for consolidation of component orders from multiple organizations will now be described in more detail with reference to the flow diagram of FIG. 2. It is to be understood that this particular process is only an example, and that additional or alternative processes for automated document parsing to determine common component identifiers for consolidation of component orders from multiple organizations may be used in other embodiments.

In this embodiment, the process includes steps 200 through 208. These steps are assumed to be performed by the intelligent component part grouping and ordering system 104 utilizing the order parsing logic 140, the component identifier mapping logic 142 and the component group ordering logic 144. The process begins with step 200, generating an automated document parser for documents exchanged as part of fulfillment of historical component orders for one or more components by a given one of a plurality of suppliers in a supply chain, the historical component orders being fulfilled for first and at least second organizations that utilize the given supplier. The documents exchanged as part of the fulfillment of the historical component orders for the one or more components by the given supplier may comprise supplier invoices generated by the given supplier.

In step 202, the automated document parser is utilized to parse the documents exchanged as part of the fulfillment of the historical component orders for the one or more components by the given supplier to identify (i) a first organization-specific component identifier utilized by the first organization for a given one of the one or more components, (ii) a second organization-specific component identifier utilized by the second organization for the given component, and (iii) a given supplier-specific component identifier utilized by the given supplier for the given component. A common component identifier for the given component is determined in step 204 based at least in part on mapping an association between the first organization-specific component identifier and the second organization-specific component identifier. The common component identifier for the given component may comprise the given supplier-specific component identifier, one of the first organization-specific component identifier and the second organization-specific component identifier, or some other value that is different than the given supplier-specific component identifier, the first organization-specific component identifier and the second organization-specific component identifier.

Figure 2:
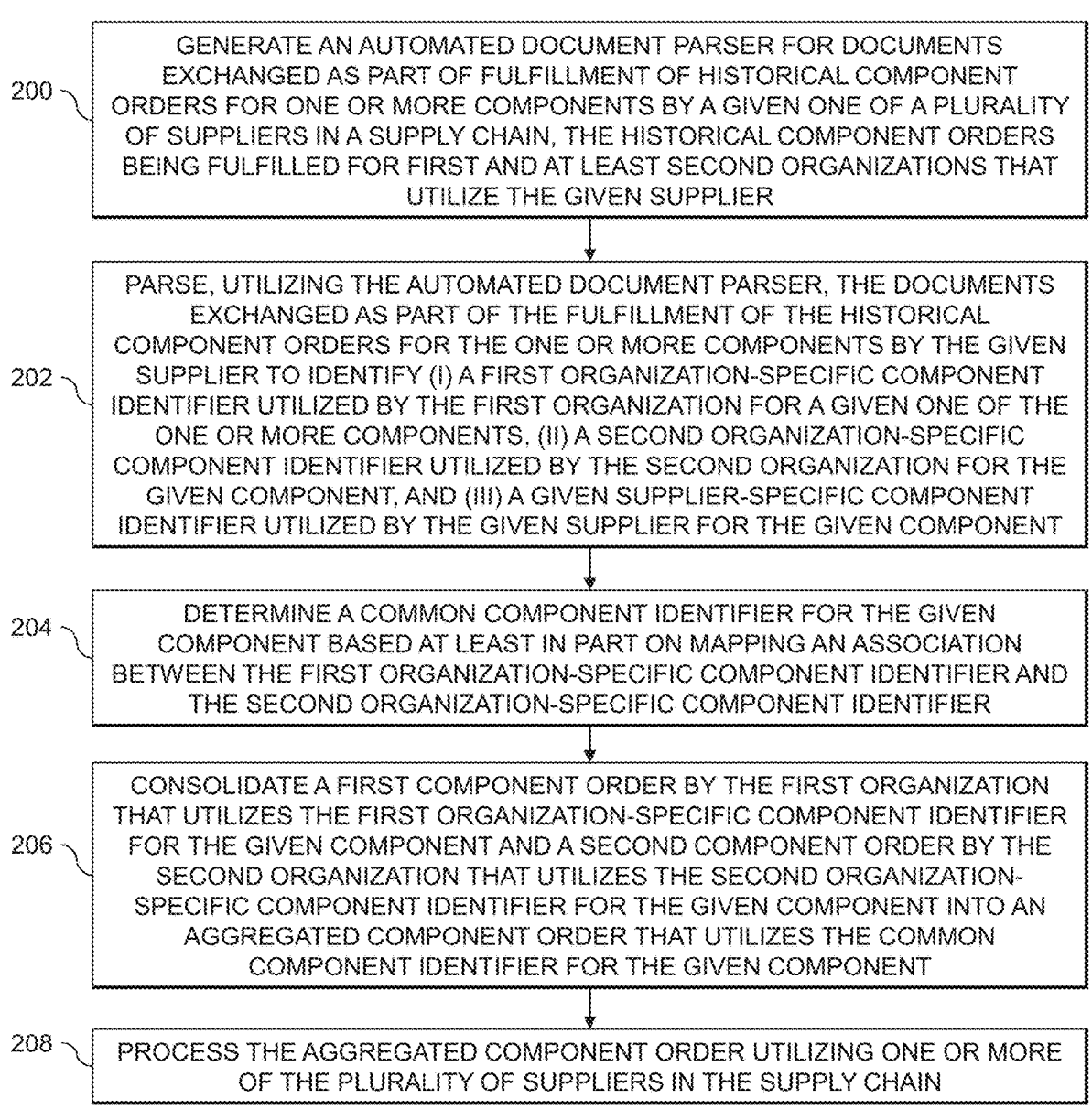
FIG. 2 is a flow diagram of an exemplary process for automated document parsing to determine common component identifiers for consolidation of component orders from multiple organizations in an illustrative embodiment.

The FIG. 2 process continues with step 206, consolidating a first component order by the first organization that utilizes the first organization-specific component identifier for the given component and a second component order by the second organization that utilizes the second organization-specific component identifier for the given component into an aggregated component order that utilizes the common component identifier for the given component. The first and second organizations, in some embodiments, are assumed to have undergone one or more merger and acquisition processes with one another prior to step 206.

In step 208, the aggregated component order is processed utilizing one or more of the plurality of suppliers in the supply chain. The first component order by the first organization may be for a first number of units of the given component, the second component order by the second organization may be for a second number of units of the given component, and the aggregated component order may be for a third number of units of the given component, the third number of units of the given component being a sum of the first number of units and the second number of units. Step 208 may comprise fulfilling the aggregated component order for the third number of units of the given component utilizing one or more of the plurality of suppliers in the supply chain and distributing the first number of units of the given component to the first organization and the second number of units of the given component to the second organization. Step 208 may also or alternatively comprise utilizing one or more volume discounts offered by at least one of the plurality of suppliers in the supply chain for orders of the given component exceeding a threshold number of units, the threshold number of units being greater than each of the first number of units and the second number of units, the threshold number of units being less than the third number of units.

In some embodiments, step 200 includes learning a structure of the documents exchanged as part of the fulfillment of the historical component orders for the one or more components by the given supplier, the learned structure specifying relative locations of supplier-specific component identifiers and corresponding organization-specific component identifiers for respective ones of the one or more components. The learned structure may further specify a padding between locations of two of the supplier-specific component identifiers. The structure of the documents exchanged as part of the fulfillment of the historical component orders for the one or more components by the given supplier may be the same for a first subset of the documents exchanged with the first organization and a second subset of the documents exchanged with the second organization.

Step 200 may comprise generating instructions for: identifying a first location of a first supplier-specific component identifier within a given one of the documents exchanged as part of the fulfillment of the historical component orders for the one or more components by the given supplier; identifying a second location of a first organization-specific component identifier within the given document, the first organization-specific component identifier corresponding to the first supplier-specific component identifier; searching the given document in a first direction, relative to the first location, to identify one or more additional supplier-specific component identifiers; and searching the given document in a second direction, relative to each of the one or more additional supplier-specific component identifiers, to identify one or more additional organization-specific component identifiers corresponding to the one or more additional supplier-specific component identifiers. The first location and the second location may comprise first and second rectangles in an image of the given document, and step 200 may further comprise generating instructions for cropping the first and second rectangles from the image of the given document and recognizing text within the cropped first and second rectangles to identify the first supplier-specific component identifier and the first organization-specific component identifier. A padding between respective ones of the supplier-specific component identifiers in the image of the given document may be determined by moving the first rectangle in the first direction to a new location in the image of the given document until text recognized within the cropped first rectangle in the new location corresponds to a recognized format of the supplier-specific component identifiers.

Mergers and acquisitions (M&A) is a general term that describes the consolidation of companies or organizations (or assets thereof) through various types of financial transactions, including but not limited to mergers, acquisitions, consolidations, tender offers, purchase of assets, management, etc. Following an M&A process involving two or more organizations, it may take a long time for the two or more organizations to get stabilized and to unify or consolidate their associated processes. Often, there are many processes to be consolidated, changed or kept as-is across the two or more organizations. If a particular M&A process is happening between two similar organizations, for example, there could be many processes to be consolidated as each of the two organizations may have similar processes for similar tasks.

Consider, as an example, two organizations that are both involved in manufacturing of similar products. Both organizations may be sourcing raw material (e.g., parts or components) from the same or similar suppliers. In some cases, both organizations are buying the same raw material from the same or different suppliers. If both organizations are in laptop and server manufacturing, for example, each of the organizations may be buying hard disks or other storage devices from different suppliers for use in manufacturing laptops and servers. There could be thousands of different raw materials depending on the sizes of the organizations, the types of products they are manufacturing, etc.

After an M&A process, if two organizations buy the same raw material (e.g., the same parts or components) from the same suppliers, purchase orders from the different organizations may be consolidated to provide various technical improvements. Such technical improvements include, but are not limited to, streamlining ordering processes, improving negotiating power (e.g., to obtain better prices or volume discounts for particular parts or components), etc. It may take a significant amount of time and manual effort, however, to consolidate the "parts" (e.g., raw material, also referred to as components) that are purchased from suppliers by different organizations, as the different organizations may be using a different naming convention for the same parts in their respective databases. If both organizations keep the supplier's part number (also referred to herein as a component identifier or component ID) as well as that organization's part number in a database, this can help for consolidation after M&A. However, this is not necessarily the case for all organizations. In some cases, different organizations operate using their own part numbers which are not necessarily stored or mapped to supplier part numbers in a database.

There is thus a need for an automated and systematic process for identifying similar parts that are used by two or more organizations, where such similar parts may be consolidated into common part groups that are used in ordering processes (e.g., to get additional volume discounts, to save time and resources for the different organizations, etc.). Such technical solutions overcome technical problems whereby at least one of two or more organizations that have undergone an M&A process does not keep a mapping of supplier-to-organization part numbers in a database. Enterprise resource planning (ERP) and product lifecycle management systems may be used to identify similar parts, such as using "product description" and other parameters of different parts or components. Manually finding the production descriptions and other parameters for a large number of parts (e.g., millions of parts), however, is time-consuming, error prone, and resource-intensive.

The technical solutions described herein provide an intelligent and efficient approach for finding the common parts between two or more organizations and their suppliers, using automated analysis of documents that are exchanged between the organizations and their suppliers (e.g., invoices or other ordering information exchanged between suppliers and individual organizations), rather than relying on manual comparison of product descriptions. The technical solutions described herein can save significant manual effort, and enable consolidated ordering for multiple organizations (e.g., to obtain better prices, to provide improved and potentially faster negotiation with suppliers, etc.).

M&A is a common phenomenon in industry. M&A processes can range from small to very large depending on the sizes of the organizations and the complexity of consolidating their associated processes. Some M&A processes, for example, can take years to get stabilized and consolidated. Even with major efforts, two organizations may still follow or utilize different processes for years after they are subject to an M&A process. In M&A processes, major concentrations of consolidation may start with HR and finance, and then continue to various other areas.

In the description below, an M&A process between two organizations that are involved in manufacturing is considered, where both organizations are assumed to manufacture similar products (e.g., storage and servers) and use the same or similar parts from the same or different suppliers. Large-scale organizations may use many different parts in manufacturing their products, have their own ERP systems, and use their own naming conventions and processes for different parts. Both organizations may be buying the parts from the same or different suppliers. One or both of the organizations may not keep or maintain a mapping between supplier part numbers and that organization's part numbers, because the organization operates with their own part numbers for all transactions. Moreover, there can be more than one supplier for a given part, or an organization may change suppliers for particular parts over time.

Figure 3:
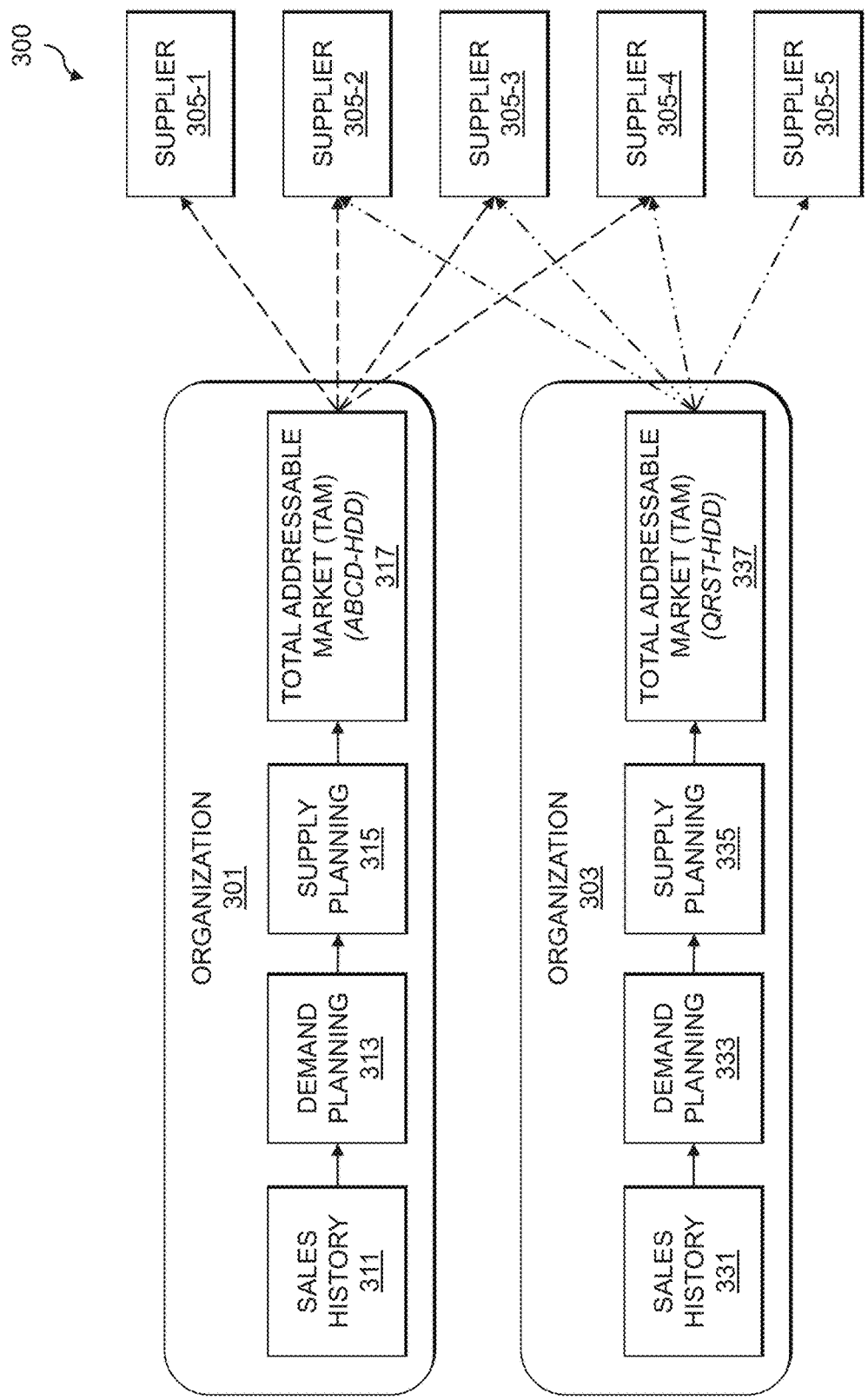
FIG. 3 shows an example of multiple organizations ordering components from different suppliers in an in illustrative embodiment.

FIG. 3 shows an example system 300 including two organizations 301 and 303, which are involved in the manufacturing of servers or other computing products. Both the organizations 301 and 303 are assumed to buy hard disk drives (HDDs) for the servers or other computing products it manufactures. The organizations 301 and 303 may have their own product master data management, ERP and planning systems. For example, organizations 301 and 303 have their own sales histories 311 and 331, demand planning 313 and 333, supply planning 315 and 335 and total addressable market (TAM) 317 and 337. The organization 301 may represent a particular HDD with the part number or component ID "ABCD" and the organization 305 may represent that same HDD with the part number or component ID "QRST." Both organizations 301 and 303 use their own planning systems for placing purchase orders for that HDD from different suppliers 305-1, 305-2, 305-3, 305-4 and 305-5 (collectively, suppliers 305).

The demand planning 313 and 333 (e.g., how much to manufacture) for the organizations 301 and 303 may be based on their respective sales histories 311 and 331. This leads to supply planning 315 and 335 (e.g., how many parts to purchase, such as how many HDDs). The supply planning 315 and 335 goes to the TAMs 317 and 337, which enables purchase of the same part from more than one of the suppliers 305 in order to defeat monopolies. The TAMs 317 and 337 send purchase orders (POs) for parts to different ones of the suppliers 305. Often, the organizations 301 and 303 may use one or more of the suppliers 305 in common. In the FIG. 3 example, the organizations 301 and 303 both use the suppliers 305-2, 305-3 and 305-4, while only the organization 301 uses supplier 305-1 and only the organization 303 uses suppliers 305-5. It should be appreciated, however, that this is just an example and that in other embodiments two organizations may use the exact same set of suppliers rather than partially overlapping subsets of a set of suppliers. In other cases, two organizations may use no suppliers in common (e.g., they may use disjoint subsets of a set of suppliers).

Assume that organization 301 purchases 1 million HDDs from the supplier 305-1 per month, and that organization 303 purchases 0.75 million HDDs from the supplier 305-1 per month. After a merger of the organizations 301 and 303, the merged organization would be purchasing 1.75 million HDDs from the supplier 305-1 per month. If a consolidated purchase is done, a procurement team of the merged organization can better negotiate with the supplier 305-1 (e.g., for a better price or volume discount).

In the FIG. 3 example, the part number or component ID of the HDD is different in the product and ERP systems of each of the organizations 301 and 303, and thus it is difficult to consolidate the part numbers or component IDs between the organizations 301 and 303. This difficulty increases as the number of different parts increases. Large-scale organizations, for example, may utilize millions of different parts, such that consolidating part numbers or component IDs among two large-scale organizations is a difficult and time-consuming manual task. The technical solutions described herein provide a systematic and automated way to consolidate such part numbers or component IDs, and to enable the organizations 301 and 303 to give requirements to the supplier 305-1 in the aggregate (e.g., 1.75 million HDDs, rather than two separate orders of 1 million and 0.75 million HDDs) after supply planning 315 and 335.

Conventional approaches to consolidating part numbers or component IDs involve significant manual effort to try to find the common part details in the product management, ERP and planning systems of two or more organizations, relying on use of product descriptions and scrubbing of product attribute data information. This suffers from various technical problems, in that such approaches are slow, time-consuming, resource-intensive, inaccurate, etc.

Different organizations may describe the same product (or parts or components thereof) differently, as the different organizations may use their own product, ERP and supply planning systems. Some organizations do not keep mappings of the part numbers or component IDs they use, as well as the part numbers or component IDs used by their suppliers. If two such organizations are merging, or one acquires another, there is no systematic way to find and consolidate the common raw materials (e.g., parts or components) that are purchased from the same or different suppliers until the systems of the two organizations are unified (e.g., which may take weeks, months, years, etc.).

This imposes restrictions to the procurement teams, as they must procure the same part for both organizations separately. This may result in a lost opportunity in negotiation (e.g., of a better discount or better price for the same part). If they could consolidate before buying, an increased volume of purchase can be shown (e.g., potentially doubling) and used to demand or negotiate a better discount and price. The proper consolidation can happen only when the two organizations' associated product, ERP and supply planning systems are unified, which can potentially take a very long time. For large acquisitions, such systems may run in parallel for a very long time. Slow and manual processes for consolidation may be used, which rely on the experience of the people and manual comparison of product descriptions in the systems used by both organizations.

The technical solutions described herein enable consolidation of part numbers or component IDs from disparate product and ERP systems of different organizations, where one or both of the organizations does not have or maintain a mapping between supplier part numbers or component IDs and that organization's (e.g., buyer) part numbers or component IDs. To do so, some embodiments utilize automated processing of invoices or other documents from suppliers for the same part for both organizations. Again consider consolidation of two organizations, denoted organization 1 (ORG1) and organization 2 (ORG2) that use a same supplier. The supplier invoice to ORG1 will use ORG1's part number or component ID for a given part (e.g., ABCD for a specific type of HDD) as well as the supplier part number or component ID (e.g., 12345). The supplier invoice to ORG2 will use ORG2's part number or component ID for the given component (e.g., QRST) and the supplier part number or component ID (e.g., 12345). As can be seen, the supplier part number or component ID is common in both invoices. The technical solutions described herein can parse invoices (e.g., PDFs, scans, electronic data interchange (EDI) messages, etc.) to build a common part number or component ID mapping—in other words, a mapping between organization-specific part numbers or component IDs and supplier-specific part numbers or component IDs. When procuring, the different organization-specific part numbers or component IDs are consolidated to generate requests to the same suppliers. Once delivered, the parts may be re-routed as needed to the different organizations whose orders were consolidated.

Figure 4A:
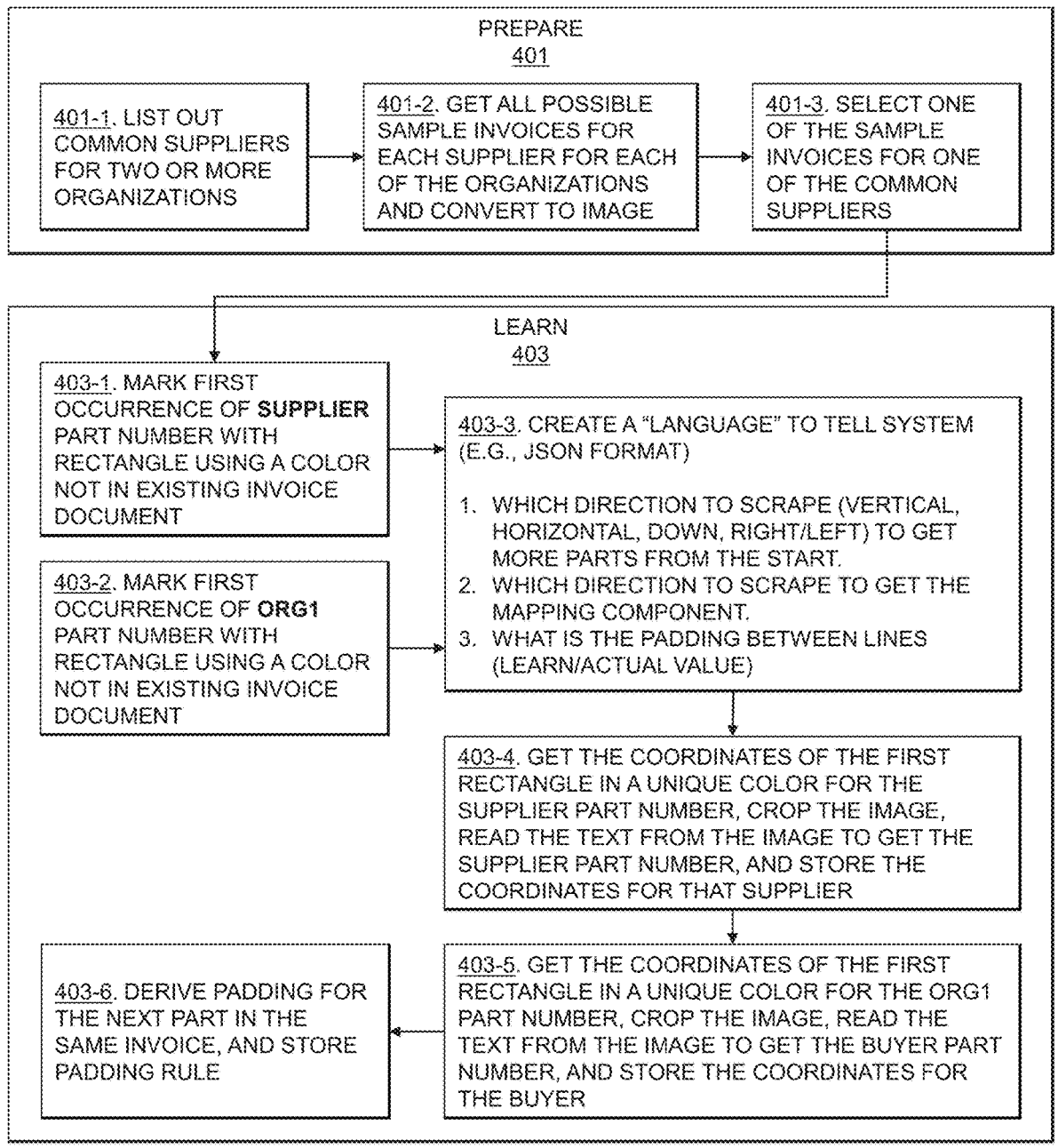
FIGS. 4A and 4B show a process flow for grouping part numbers or component identifiers into a common part number or component identifier group for ordering in an illustrative embodiment.
Figure 4B:
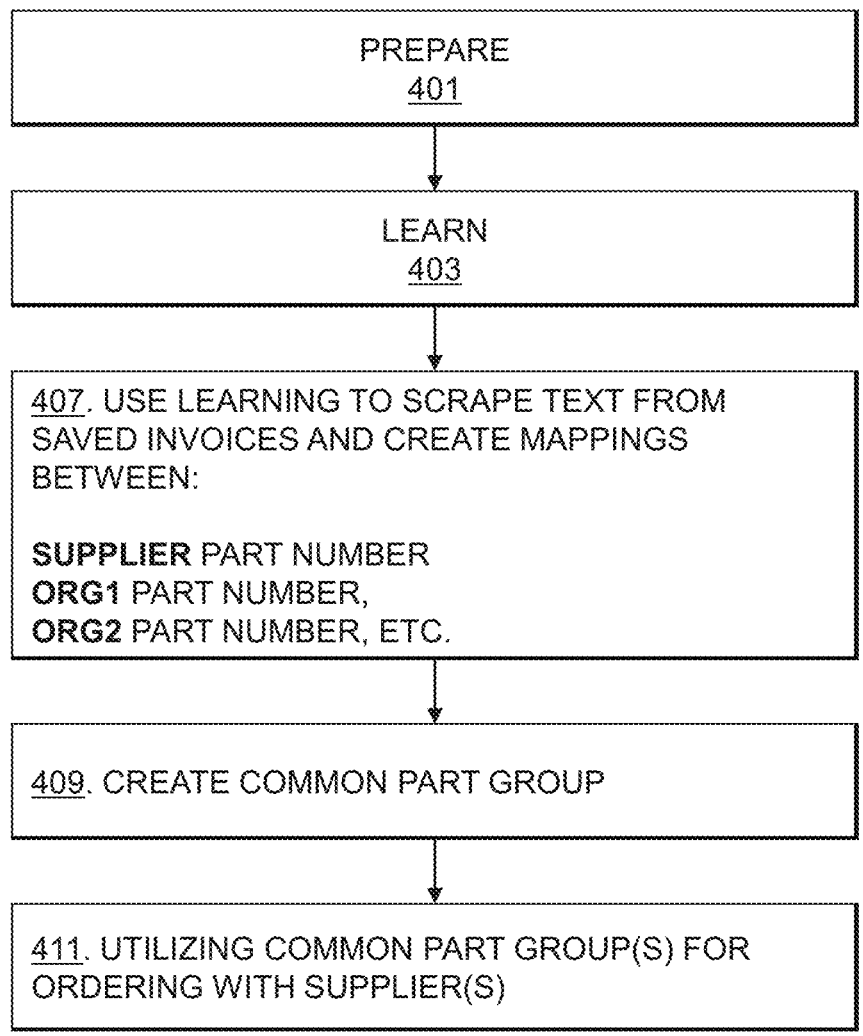

FIGS. 4A and 4B show an overview of the technical solution. As shown in FIG. 4A, the solution includes a prepare stage 401 and a learn stage 403. The prepare stage 401 includes:

401-1. Listing out all common suppliers for two or more organizations;

401-2. Getting all possible sample invoices for each supplier to the two or more organizations, and converting such sample invoices to images. The sample invoices may be in various formats (e.g., PDF, image, Word documents, etc.); and 401-3. Selecting one of the sample invoices.

The learn stage 403 includes:

403-1. Marking the first occurrence of the supplier part number or component ID with a rectangle using a first color that is not used in the selected sample invoice document;

403-2. Marking the first occurrence of a first one of the two or more organizations (ORG1)'s part number or component ID with a rectangle using a second color that is not used in the selected sample invoice document;

403-3. Create a "language" to tell the system various information (e.g., in a JavaScript Object Notation (JSON) or other suitable format), such as (1) which direction to scrape (e.g., vertical, horizontal, down, right or left, etc.) to get more supplier-specific part numbers or component IDs from the starting supplier-specific part number or component ID, (2) which direction to scrape (e.g., vertical, horizontal, up or down, right or left, etc.) to get the mapping component (e.g., the associated organization-specific part number or component ID), and (3) what is the padding between lines (e.g., which may be a learned or actual value);

403-4. Getting the coordinates of the first rectangle of the first color for the supplier-specific part number or component ID, cropping the image, reading the text from the image to get the supplier-specific part number or component ID, and storing the coordinates for the supplier;

403-5. Getting the coordinates of the first rectangle of the second color for the ORG1-specific part number or component ID, cropping the image, reading the text from the image to get the ORG1-specific part number or component ID, and storing the coordinates for the "buyer" (e.g., as for each organization that uses a common supplier, the invoice structure of that supplier is assumed to be the same); and

403-6. Deriving the padding for the next set of supplier-specific and organization-specific part numbers or component IDs in the selected sample invoice, and storing a padding rule.

The learn stage 403 may be repeated for different selected sample invoices to build a database of part number or component ID mappings.

As shown in FIG. 4B, the output of the learn stage 403 is used to scrape the text from all saved invoices to create mappings in step 407. Each mapping would include: a supplier-specific part number or component ID, an ORG1-specific part number or component ID, and an ORG2-specific part number or component ID. In step 409, a common part group is created. The common part group is utilized in step 411 for ordering with suppliers (e.g., for better negotiation of discounts or prices).

Figure 5A:
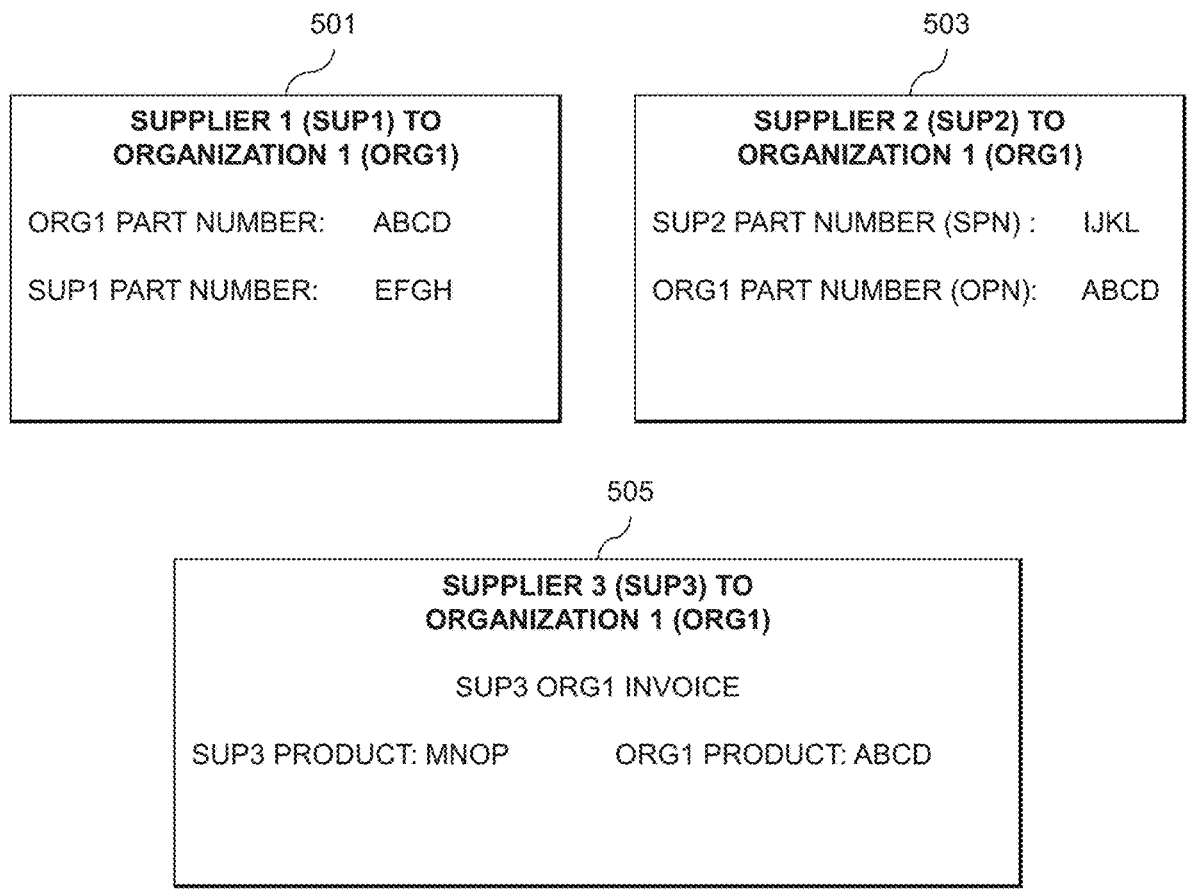
FIGS. 5A-5C show examples of invoice structures for different organizations ordering from different suppliers in an illustrative embodiment.
Figure 5B:
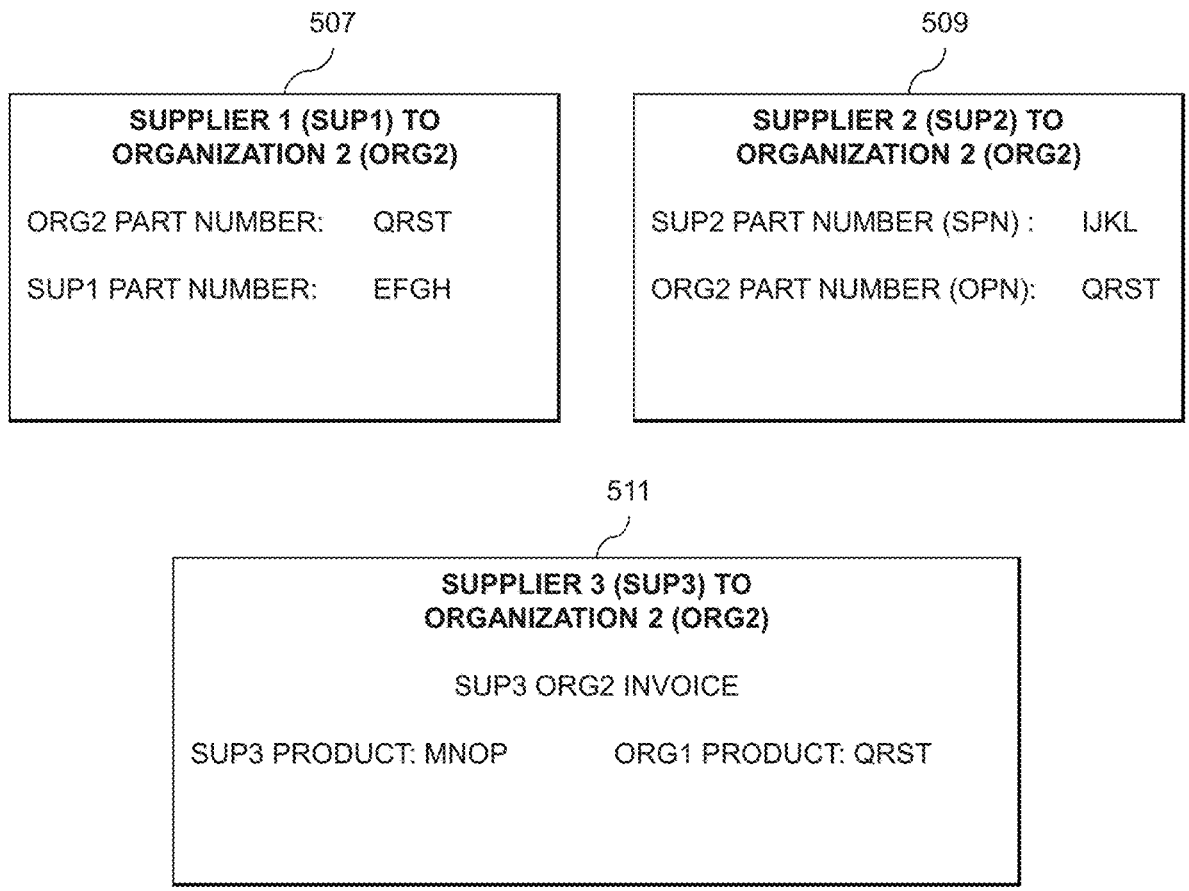

A technical problem to be addressed includes that each supplier's invoice structure may be different. The same part requirement may be given to more than one supplier. A particular organization, for example, may have a need for 1000 HDDs, which may be given to three suppliers (e.g., 250 to a first supplier, 250 to a second supplier, and 500 to a third supplier) in order to prevent a monopoly. Again consider two organizations, denoted ORG1 and ORG2, which utilize three suppliers, denoted SUP1, SUP2 and SUP3, for ordering a given part or component (e.g., a HDD). The invoice structure from each of the suppliers may be different. FIG. 5A shows examples of invoice structures 501, 503 and 505 for ORG1 and the different suppliers SUP1, SUP2 and SUP3. FIG. 5B shows examples of invoice structures 507, 509 and 511 for ORG2 and the different suppliers SUP1, SUP2 and SUP3. The different suppliers use different invoice structures as illustrated in FIGS. 5A and 5B, where the particular relative locations of the organization-specific and supplier-specific part numbers or component IDs vary. Each of the different suppliers SUP1, SUP2 and SUP3, however, is assumed to use the same invoice structure or format for both of the organizations ORG1 and ORG2.

The approach of the technical solutions described herein includes parsing different sample invoices to find commonalities. In the example of FIGS. 5A and 5B for the invoice structures 501 and 507 from SUP1 to ORG1 and ORG2, the supplier part number or SPN is the same (e.g., EFGH). Even where the ORG1 and ORG2 part numbers or OPNs are different (e.g., ABCD for ORG1, QRST for ORG2), they are in the same location in the invoice structures 501 and 507. If the location of the OPNs are known, and the location of the common SPN is known, a mapping for SUP1 for a given component (e.g., a HDD) can be built as:

SUP1 part number: EFGH
ORG1 part number: AB CD
ORG2 part number: QRST

Figure 5C:
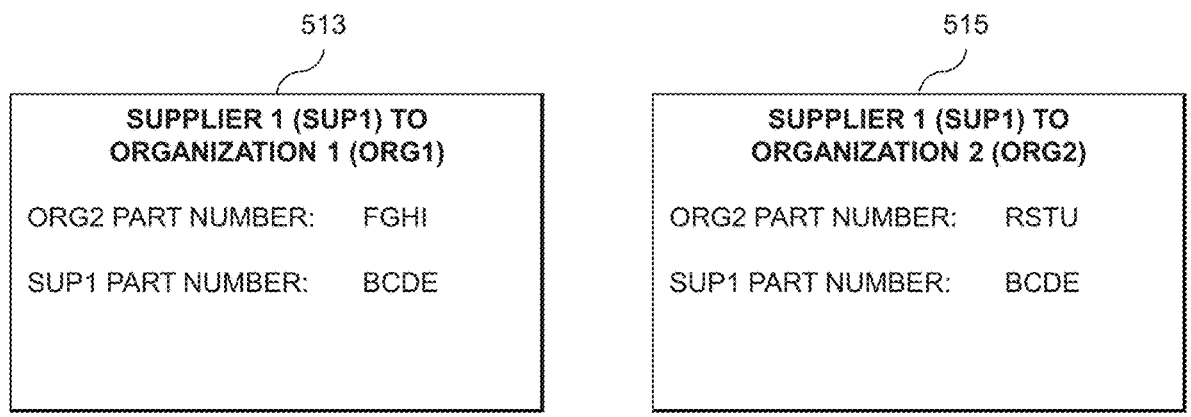

For other parts or components from the same supplier, the structure and locations of the SPN and OPNs in the invoices may remain the same. For a different part or component (e.g., a USB port), the SUP1 part number may be BCDE, with the ORG1 part number being FGHI and the ORG2 part number being RSTU as shown in the sample invoices 513 and 515 of FIG. 5C. Similarly, common part number or component ID mappings may be created for the other suppliers.

Figure 6:
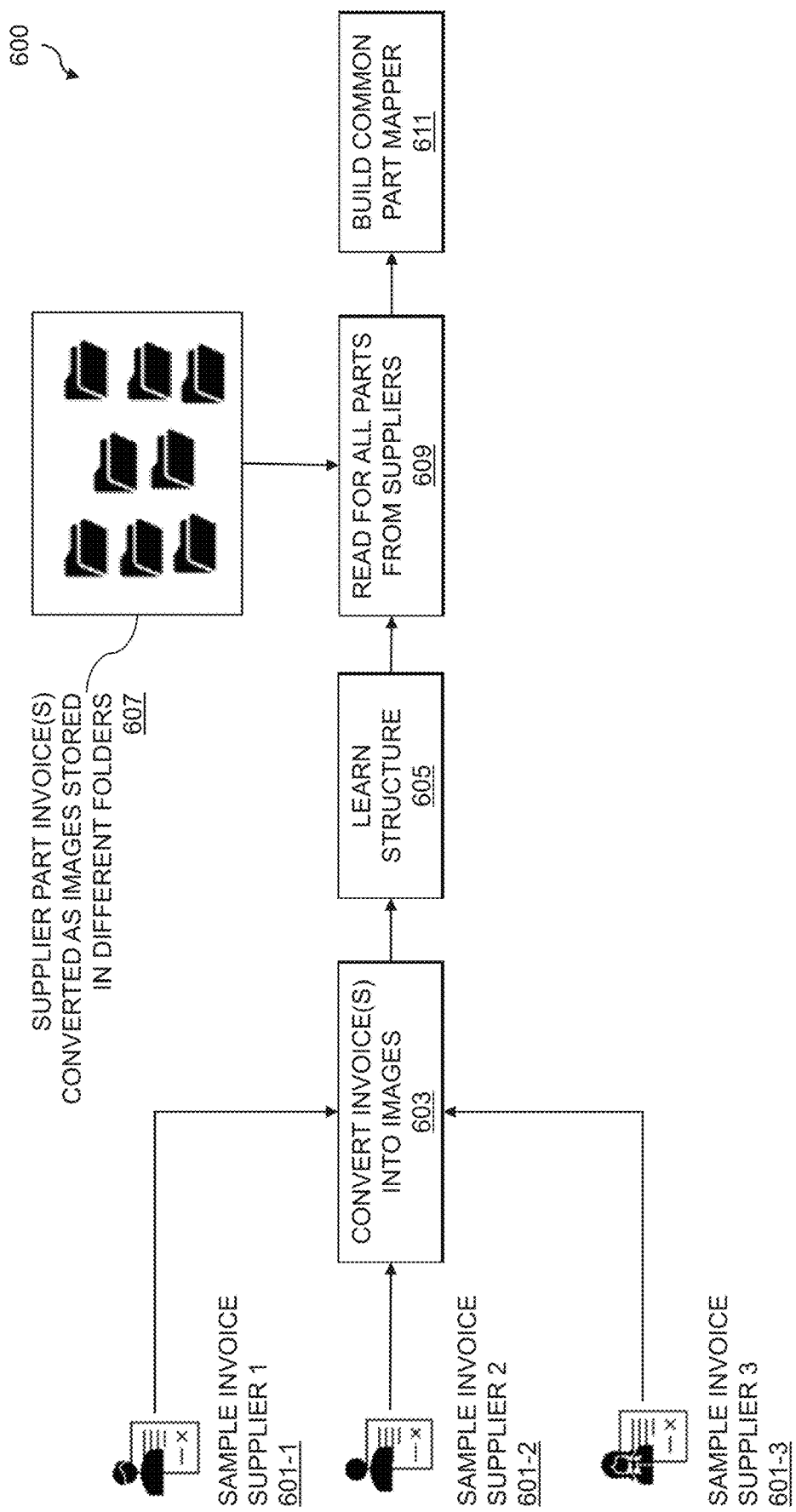
FIG. 6 shows a process flow for building common part number or component identifier groups in an illustrative embodiment.

An overall process flow 600 for building the common part number or component ID groupings between organizations is shown in FIG. 6. The process flow 600 begins with obtaining invoices from common suppliers for each of two or more organizations. In the FIG. 6 example, this includes sample invoices 601-1, 601-2 and 601-3 (collectively, sample invoices 601) from suppliers 1, 2 and 3. In step 603, the sample invoices 601 are converted to a common image format. Learning is then performed in step 605. The learning step 605 includes learning the structure of each of the sample invoices 601. The learned structure may include: the location of the supplier-specific part numbers and the organization-specific part numbers for each supplier's invoice format; and the padding between lines to read multiple part numbers in a given invoice format. The learned structure (e.g., the location and padding information) may be stored for each invoice format to read part or component details.

The converted images from step 603 are stored in a database 607, where the images are stored in different folders. The converted images from the database 607 are read for all parts from the different suppliers in step 609. A common part mapper is then built in step 611. The common part mapper for a given part may use the supplier-specific part number (or a selected one of the organization-specific part numbers, or a new part number) as the common name, and includes organization-specific part numbers for each of the organizations. Any discrepancies are removed, and the common name for the same part is used by both organizations for future orders.

Learning the invoice or other document structure is an important part of the technical solutions described herein. First, the structure of specific supplier invoices to different organizations is learned, so that the organization-specific part numbers for different organizations as well as the supplier-specific part numbers can be read from the supplier invoices. There are various different types and formats used in supplier invoices. Some of the supplier invoices are highly structured (e.g., to get a one-to-one mapping). FIGS. 7A and 7B show examples of invoices 700 and 705, in which part numbers are listed in grids or tables 701 and 706. The invoices 700 and 705 are sent from a same supplier (SUP1) to different organizations (ORG1 and ORG2, respectively). The tables 701 and 706 include a first column with the supplier's part numbers, a second column with the organization's part numbers, and additional columns for descriptions, quantities, unit prices, and amounts. When the invoices 700 and 705 are analyzed to learn the invoice structure, a language is used for identifying this structure. In some embodiments, a JSON format is used. FIG. 7C shows an example of learning the structure, where the sample invoice 700 from SUP1 to ORG1 is analyzed and a first rectangle (with gray border) is drawn around the first SUP1 part number and a second rectangle (with black border) is drawn around the corresponding ORG1 part number. The first rectangle is specified in new language that indicates that more SUP1 part numbers are in the same column of the table 701. The second rectangle is also specified in new language indicating that each of the SUP1 part numbers has a corresponding ORG1 part number to its right.

FIG. 8 shows an example of pseudocode 800 for JSON instructions for parsing the invoices of SUP1 (e.g., the invoices 700 and 705 shown in FIGS. 7A and 7B). Using this, the learning module knows to begin with the "gray" rectangle to start reading the SUP1 part number, and that more SUP1 part numbers are repeated in a downward direction. There is a need to skip padding while reading the second SUP1 part number. The padding should be learned, and the JSON instructions may be updated accordingly. If the padding is known, it may be specified (e.g., by an end-user). The padding may be kept in points or pixels (e.g., a padding of 3 points or pixels will skip 3 points or pixels down to create another "gray" rectangle indicating another SUP1 part number). The learning module can also use the instructions to identify the "black" rectangle to start reading the "buyer" part number (where the "buyer" part number locations would be the same across organizations for the same supplier SUP1). The instructions indicate that the buyer part number is to the right of the SUP1 part number, so that pairs of supplier and buyer part numbers are identified.

Figure 9:
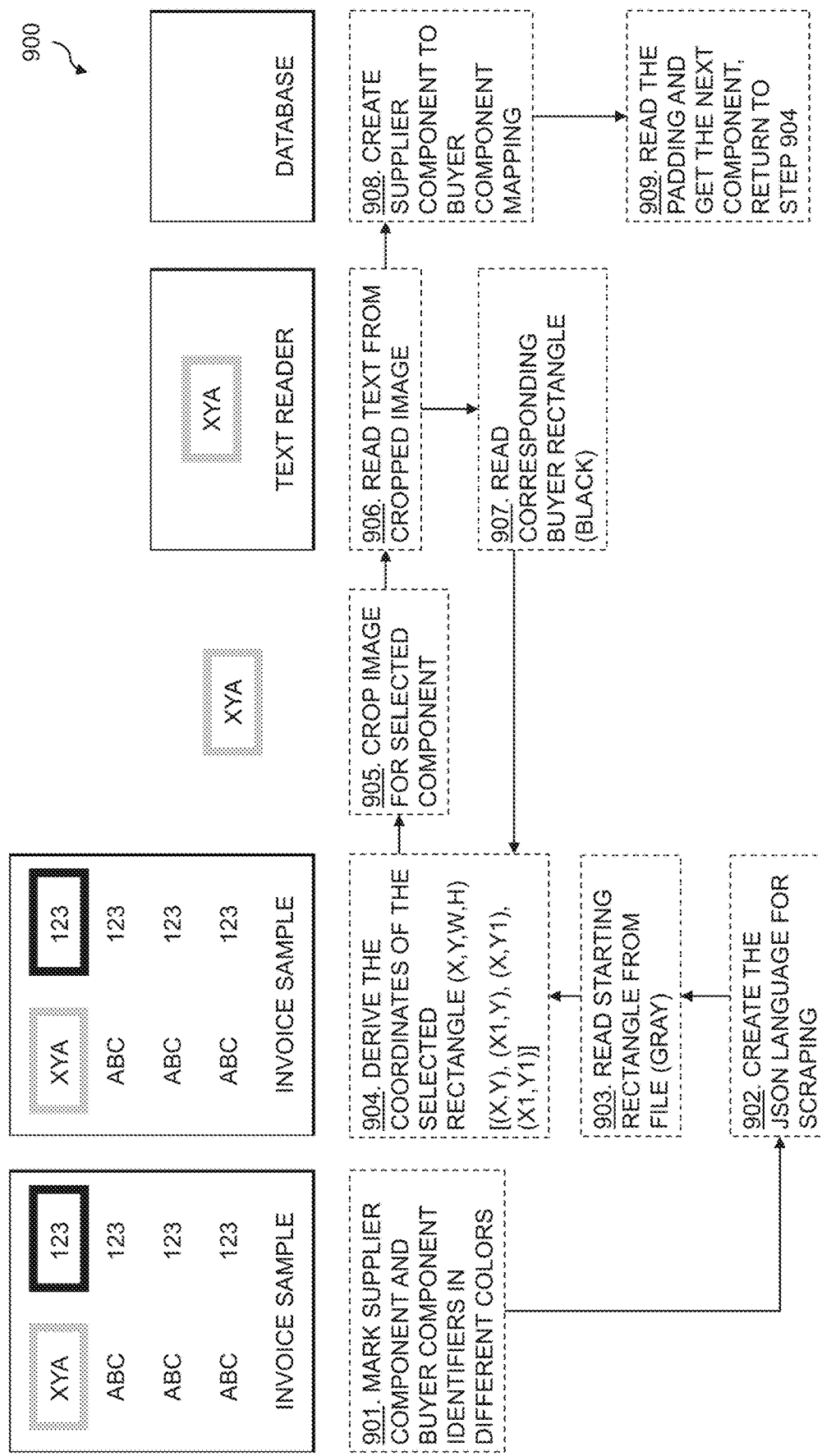
FIG. 9 shows a process flow for generating a database of common part number or component identifier groups in an illustrative embodiment.

FIG. 9 shows a process flow 900 for the processing of invoices or other documents from a supplier (e.g., SUP1), which includes reading the instructions shown in the pseudocode 800 of FIG. 8. In step 901, the supplier and buyer part numbers or component IDs are marked in a sample invoice using the designated colors from the JSON instructions (e.g., gray for the supplier, black for the buyer). In step 902, instructions for scraping the sample invoice are created or obtained. A starting rectangle for the first supplier part number (e.g., with the gray outline) is read in step 903. The coordinates of this rectangle are then derived in step 904. The rectangle has an X,Y coordinate of its top-left corner, along with height (H) and width (W) values. This is used to derive the four coordinates of the rectangle as: [(X,Y), (X1,Y), (X,Y1), (X1,Y1)], where X1=X+W and Y1=Y-H. An image is created in step 905 by cropping the sample invoice at the coordinates derived in step 904. Text from the cropped image is then read in step 906. The corresponding buyer part number rectangle (e.g., with the black outline) is read in step 907 (e.g., repeating steps 904 through 906). To do so, the "direction" of the buyer part number with respect to the supplier part number may be read or determined from the scraping language created in step 902. A supplier part number or component ID to buyer part number of component ID mapping is then created in step 908. In step 909, padding information is read to get the next supplier part number or component ID, and processing returns to step 904. Once the coordinates are learned for a particular invoice or other document format, other invoices or documents with that format (e.g., other invoices from the same supplier) may be parsed using the same coordinates to build all the part mappings for that supplier.

Various computer vision tools may be used to draw the rectangles around the supplier and buyer part numbers or component IDs. In some embodiments, OpenCV tools are used to get the coordinates of the rectangles drawn. To begin, the object with the first specified color (e.g., "gray" for the supplier part number in the example above) is drawn. It should be noted that the first specified color should be a "unique" color (e.g., one that is not already used in the sample invoice or other document being parsed). Similarly, the second specified color (e.g., "black" for the buyer component ID in the example above) should also be a "unique" color. The coordinates of the supplier part number rectangle may be read using the pseudocode 1000 of FIG. 10A. An image of the supplier part number rectangle is then extracted or cropped from the larger image to read the text therein and identify the value of the supplier component ID. To do so, the pseudocode 1005 of FIG. 10B may be used. The pseudocode 1005 uses OpenCV to extract an image with specific coordinates (e.g., those of the supplier part number rectangle). The text within the cropped image is then read using the pseudocode 1010 of FIG. 10B. The pseudocode 1010 uses the "pytesseract" library for reading the text. A check is then performed to determine if the data is accurate for the organization component (if so, the supplier component data is also accurate). In each supplier's invoice or other document format, the line spacing or padding between the lines may be different. The padding to use for a particular invoice or document format may be given by the user, or learned automatically.

Figure 11A:
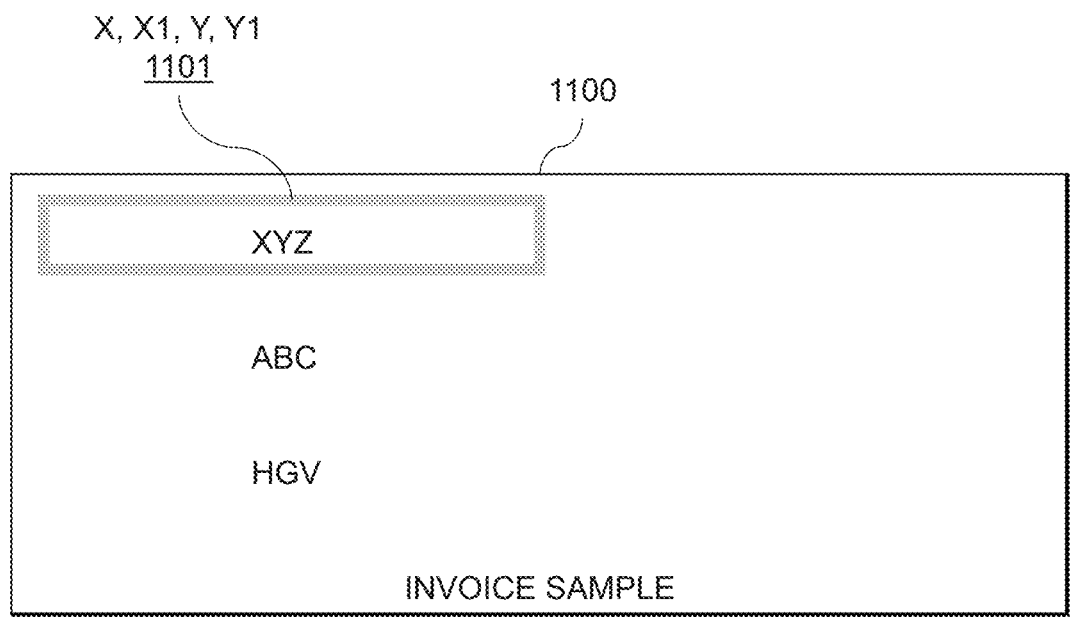

FIGS. 11A-11D illustrate learning the padding between lines for reading the next part numbers from an invoice or other document. A rectangle is drawn for the first line in the grid or table of a sample invoice (e.g., corresponding to the first part number). Using this initial rectangle, the first part mapping is created (e.g., between a supplier part number or component ID and a buyer part number or component ID). To read the next part number in the grid system, new coordinates are needed. In some embodiments, it is assumed that the line spacing between part numbers or component IDs in a grid or table of the sample invoice is the same. FIG. 11A shows a sample invoice 1100, where a rectangle 1101 is drawn around a first part number or component ID "XYZ" with coordinates (X, X1, Y, Y1). If the padding starts with "H" (Y-Y1), the padding value is subtracted from the "Y1" coordinates assuming that the scraping direction is "down." For other scraping directions, different starting paddings and arithmetic operations involving the padding value may be used. As an example, if the scraping direction is "right" then the padding may start with "W" (X-X1) and the padding value is added to the X1 coordinate. Various other examples are possible.

Figure 11B:
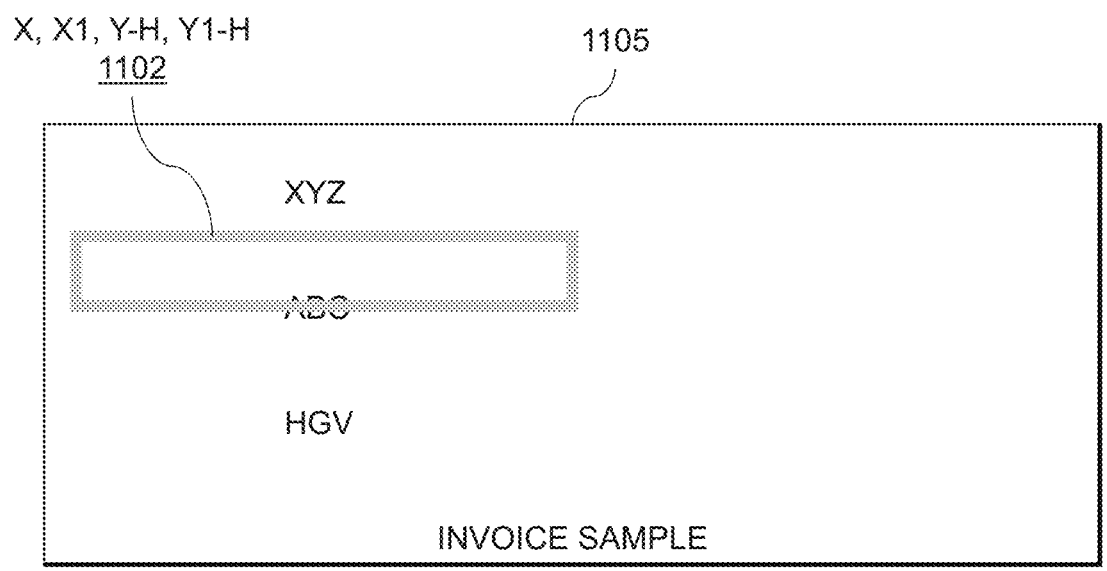
Figure 11C:
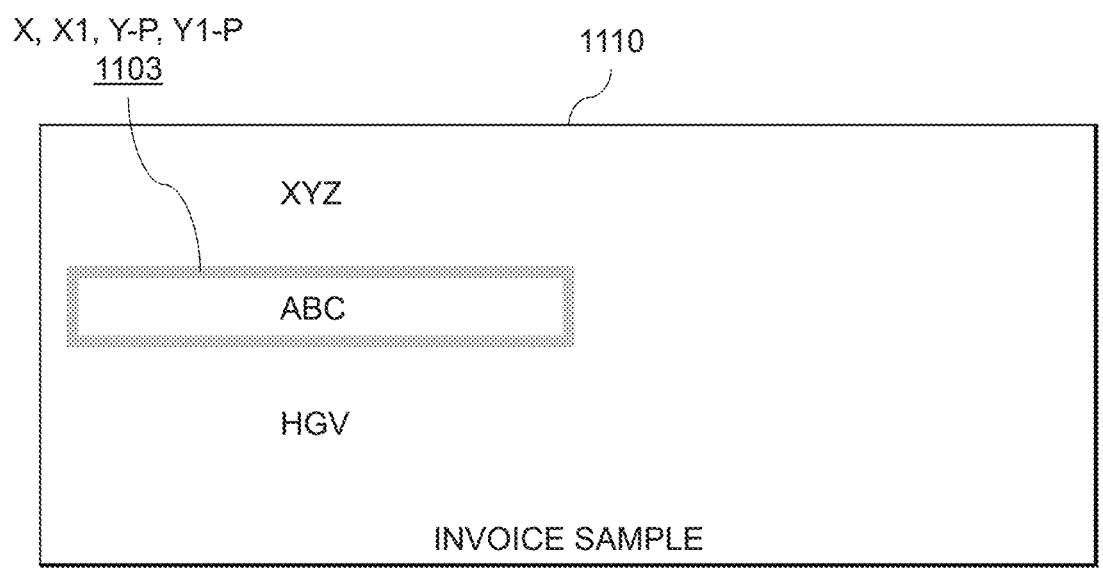

Continuing with the above example where the scraping direction is down and the padding starts with "H", the next coordinates for rectangle 1102 will be (X, X1, Y-H, Y1-H) as shown in the example 1105 of FIG. 11B. With these new coordinates, the image is cropped and the text will not be read correctly. Thus, more padding is added until a rectangle is reached from which meaningful text can be read from the cropped image. This is shown in the example 1110 of FIG. 11C, where a correct padding "P" is identified for rectangle 1103 and the padding "P" is set for further reads. FIG. 11D shows a table 1115 illustrating padding values that are determined for different supplier invoice or document formats, showing columns for the supplier, initial supplier part number or component ID coordinates, initial buyer part number or component ID coordinates, the padding for the next line, and a configuration file path.

Once the mappings for all common suppliers among multiple organizations are learned, a part mapper reads from the folders or other locations where the invoices or other documents from particular suppliers are stored to get the part mappings for all parts. The common part mappings for the same or similar parts can then be created. By using the common part number from the mapping, ordering from multiple organizations can be consolidated. Once parts are received, they can be allocated back to the different organizations in accordance with percentages associated with the different organization-specific part numbers.

Figure 12:
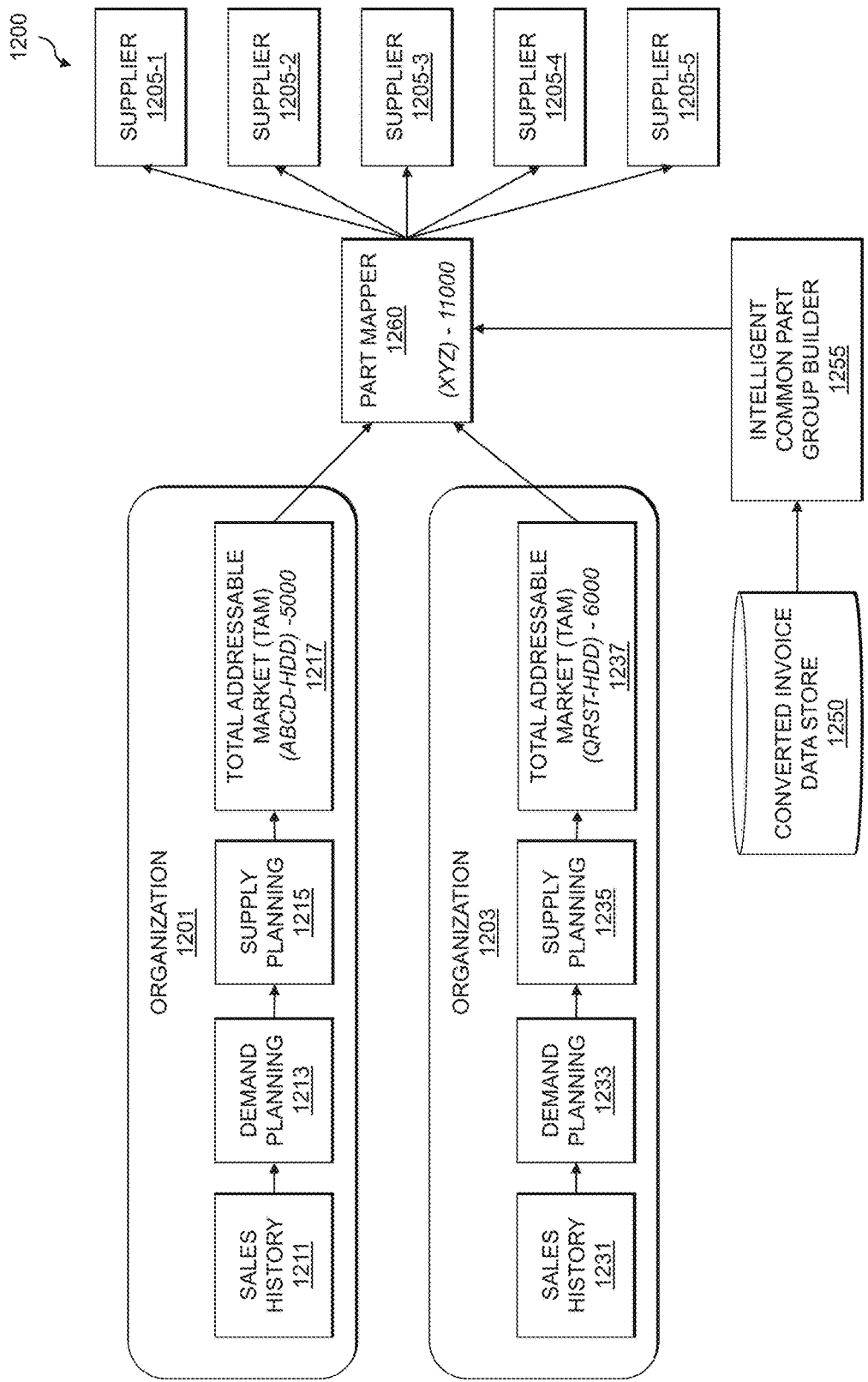
FIG. 12 shows an example of multiple organizations ordering device components from different suppliers using common part number or component identifier group ordering in an in illustrative embodiment.

FIG. 12 shows the overall system 1200, which similar to the system 300 of FIG. 3 includes two organizations 1201 and 1202 with respective sales histories 1211 and 1231, demand planning 1213 and 1233, supply planning 1215 and 1235, and TAMs 1217 and 1237 for ordering parts or components from a set of suppliers 1205-1, 1205-2, 1205-3, 1205-4 and 1205-5 (collectively, suppliers 1205). In the system 1200, an intelligent common part group builder 1255 and part mapper 1260 are used to consolidate orders from the organizations 1201 and 1203 to the suppliers 1205. The intelligent common part group builder 1255 uses a data store of converted invoices 1250 for identifying mappings between different part numbers or component IDs. The part mapper 1260 uses such mappings to consolidate orders for a particular component (e.g., the HDD with the part number or component ID "ABCD" in organization 1201 and the part number or component ID "QRST" in organization 1203). Here, the order for 5000 HDDs from organization 1201 is consolidated with the order of 6000 HDDs from organization 1203 to generate a single order of 11,000 HDDs that is provided to the suppliers 1205 (e.g., which may be used as leverage in negotiation, such as for volume discounts or better prices).

The technical solutions described herein provide techniques for building common part or component groups for consolidating orders from multiple organizations (e.g., newly merged organizations until the product, ERP and planning systems thereof are unified). To do so, invoices or other documents from suppliers of the organizations are parsed to identify mappings between the supplier part numbers or component IDs and corresponding buyer part numbers or component IDs that are used by different ones of the organizations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated document parsing to determine common component identifiers for consolidation of component orders from multiple organizations will now be described in greater detail with reference to FIGS. 13 and 14. Although described in the context of system 100, these platforms may also be used to implement at least portions of other information processing systems in other embodiments.

Figure 13:
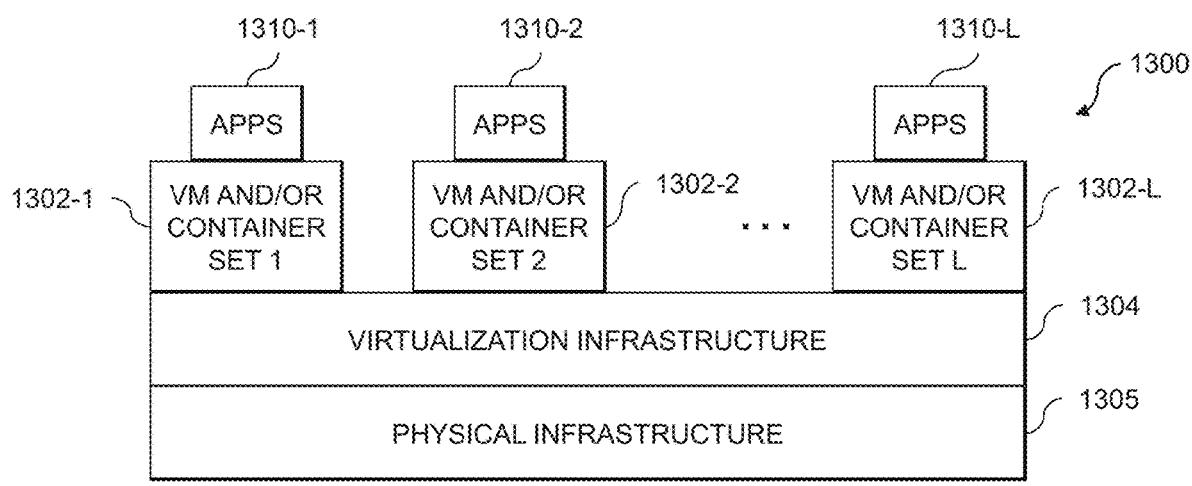
FIGS. 13 and 14 show examples of processing platforms that may be utilized to implement at least a portion of an information processing system in illustrative embodiments.
Figure 14:
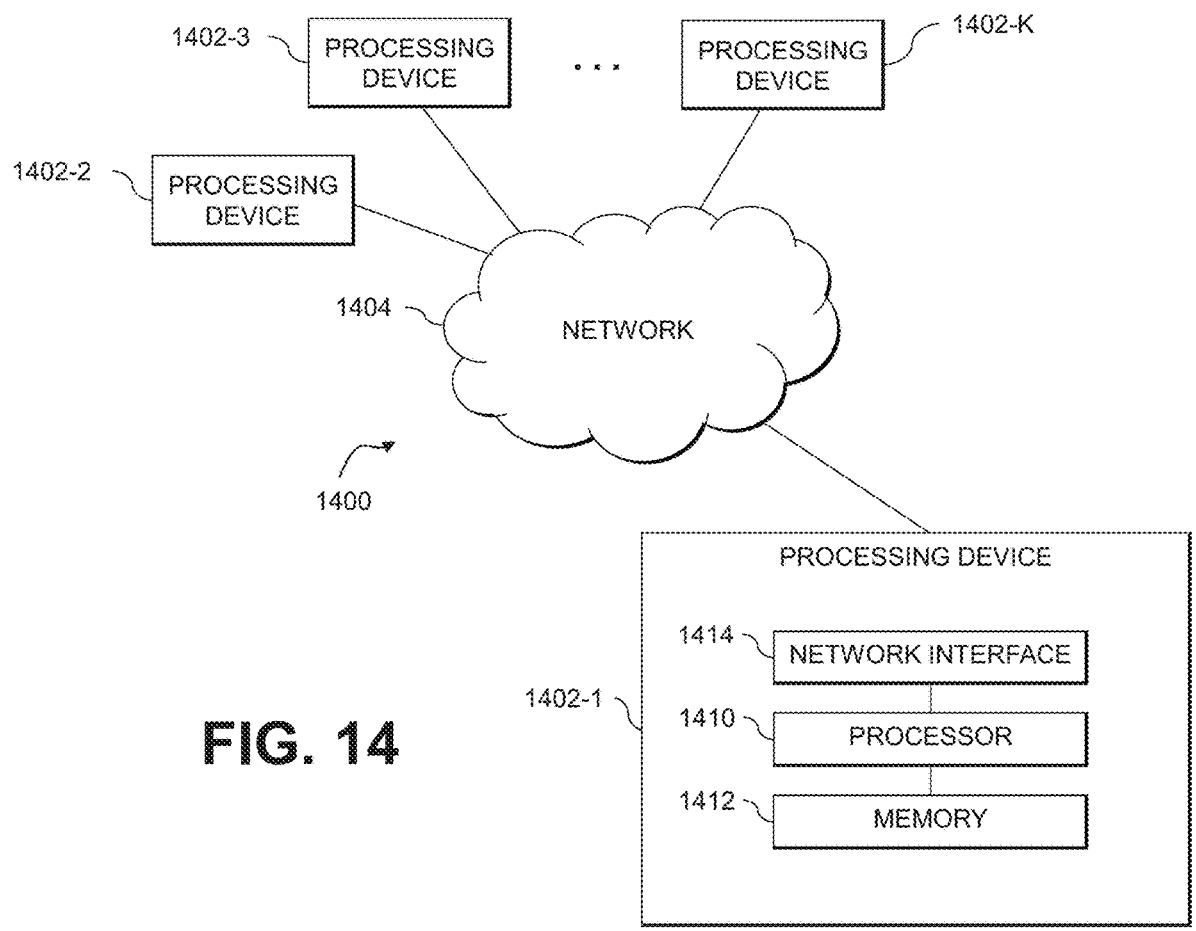

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated document parsing to determine common component identifiers for consolidation of component orders from multiple organizations as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        generating an automated document parser for documents exchanged as part of fulfillment of historical component orders for one or more components by a given one of a plurality of suppliers in a supply chain, the historical component orders being fulfilled for first and at least second organizations that utilize the given supplier;
        parsing, utilizing the automated document parser, the documents exchanged as part of the fulfillment of the historical component orders for the one or more components by the given supplier to identify (i) a first organization-specific component identifier utilized by the first organization for a given one of the one or more components, (ii) a second organization-specific component identifier utilized by the second organization for the given component, and (iii) a given supplier-specific component identifier utilized by the given supplier for the given component;
        determining a common component identifier for the given component based at least in part on mapping an association between the first organization-specific component identifier and the second organization-specific component identifier;
        consolidating a first component order by the first organization that utilizes the first organization-specific component identifier for the given component and a second component order by the second organization that utilizes the second organization-specific component identifier for the given component into an aggregated component order that utilizes the common component identifier for the given component; and
        processing the aggregated component order utilizing one or more of the plurality of suppliers in the supply chain;
    wherein generating the automated document parser is based at least in part on determining relative locations of one or more supplier-specific component identifiers and corresponding organization-specific component identifiers for respective ones of the one or more components in the documents exchanged as part of the fulfillment of the historical component orders for the one or more components by the given supplier.

2. The apparatus of claim 1 wherein prior to consolidating the first and second component orders, the first organization and the second organization have undergone one or more merger and acquisition processes with one another.

3. The apparatus of claim 1 wherein the common component identifier for the given component comprises the given supplier-specific component identifier.

4. The apparatus of claim 1 wherein the common component identifier for the given component comprises one of the first organization-specific component identifier and the second organization-specific component identifier.

5. The apparatus of claim 1 wherein the documents exchanged as part of the fulfillment of the historical component orders for the one or more components by the given supplier comprise supplier invoices generated by the given supplier.

6. The apparatus of claim 1 wherein determining the relative locations of the one or more supplier-specific component identifiers and the corresponding organization-specific component identifiers for respective ones of the one or more components comprises learning a structure of the documents exchanged as part of the fulfillment of the historical component orders for the one or more components by the given supplier.

7. The apparatus of claim 6 wherein the learned structure specifies a padding between locations of two of the supplier-specific component identifiers of the one or more components.

8. The apparatus of claim 6 wherein the learned structure of the documents exchanged as part of the fulfillment of the historical component orders for the one or more components by the given supplier is the same for a first subset of the documents exchanged with the first organization and a second subset of the documents exchanged with the second organization.

9. The apparatus of claim 1 wherein generating the automated document parser comprises generating instructions for:
  identifying a first location of a first one of the one or more supplier-specific component identifiers within a given one of the documents exchanged as part of the fulfillment of the historical component orders for the one or more components by the given supplier;
  identifying a second location of a first one of the organization-specific component identifiers within the given document, the first organization-specific component identifier corresponding to the first supplier-specific component identifier;
  searching the given document in a first direction, relative to the first location, to identify one or more additional ones of the one or more supplier-specific component identifiers; and
  searching the given document in a second direction, relative to each of the one or more additional supplier-specific component identifiers, to identify one or more additional ones of the organization-specific component identifiers corresponding to the one or more additional supplier-specific component identifiers.

10. The apparatus of claim 9 wherein the first location and the second location comprise first and second rectangles in an image of the given document, and wherein generating the automated document parser further comprises generating instructions for cropping the first and second rectangles from the image of the given document and recognizing text within the cropped first and second rectangles to identify the first supplier-specific component identifier and the first organization-specific component identifier.

11. The apparatus of claim 10 wherein a padding between respective ones of the supplier-specific component identifiers in the image of the given document is determined by moving the first rectangle in the first direction to a new location in the image of the given document until text recognized within the cropped first rectangle in the new location corresponds to a recognized format of the supplier-specific component identifiers.

12. The apparatus of claim 1 wherein the first component order by the first organization is for a first number of units of the given component, the second component order by the second organization is for a second number of units of the given component, and the aggregated component order is for a third number of units of the given component, the third number of units being a sum of the first number of units and the second number of units.

13. The apparatus of claim 12 wherein processing the aggregated component order comprises fulfilling the aggregated component order for the third number of units of the given component utilizing said one or more of the plurality of suppliers in the supply chain and distributing the first number of units of the given component to the first organization and the second number of units of the given component to the second organization.

14. The apparatus of claim 12 wherein processing the aggregated component order comprises utilizing one or more volume discounts offered by at least one of the plurality of suppliers in the supply chain for orders of the given component exceeding a threshold number of units, the threshold number of units being greater than each of the first number of units and the second number of units, the threshold number of units being less than the third number of units.

15. A computer program product comprising a non-transitory processor-readable storage medium having stored therein program code of one or more software programs, wherein the program code when executed by at least one processing device causes the at least one processing device to perform steps of:
  generating an automated document parser for documents exchanged as part of fulfillment of historical component orders for one or more components by a given one of a plurality of suppliers in a supply chain, the historical component orders being fulfilled for first and at least second organizations that utilize the given supplier;
  parsing, utilizing the automated document parser, the documents exchanged as part of the fulfillment of the historical component orders for the one or more components by the given supplier to identify (i) a first organization-specific component identifier utilized by the first organization for a given one of the one or more components, (ii) a second organization-specific component identifier utilized by the second organization for the given component, and (iii) a given supplier-specific component identifier utilized by the given supplier for the given component;
  determining a common component identifier for the given component based at least in part on mapping an association between the first organization-specific component identifier and the second organization-specific component identifier;
  consolidating a first component order by the first organization that utilizes the first organization-specific component identifier for the given component and a second component order by the second organization that utilizes the second organization-specific component identifier for the given component into an aggregated component order that utilizes the common component identifier for the given component; and
  processing the aggregated component order utilizing one or more of the plurality of suppliers in the supply chain;
  wherein generating the automated document parser is based at least in part on determining relative locations of one or more supplier-specific component identifiers and corresponding organization-specific component identifiers for respective ones of the one or more components in the documents exchanged as part of the fulfillment of the historical component orders for the one or more components by the given supplier.

16. The computer program product of claim 15 wherein determining the relative locations of the one or more supplier-specific component identifiers and the corresponding organization-specific component identifiers for respective ones of the one or more components comprises learning a structure of the documents exchanged as part of the fulfillment of the historical component orders for the one or more components by the given supplier.

17. The computer program product of claim 16 wherein the learned structure specifies a padding between locations of two of the supplier-specific component identifiers of the one or more components.

18. A method comprising:
  generating an automated document parser for documents exchanged as part of fulfillment of historical component orders for one or more components by a given one of a plurality of suppliers in a supply chain, the historical component orders being fulfilled for first and at least second organizations that utilize the given supplier;

parsing, utilizing the automated document parser, the documents exchanged as part of the fulfillment of the historical component orders for the one or more components by the given supplier to identify (i) a first organization-specific component identifier utilized by the first organization for a given one of the one or more components, (ii) a second organization-specific component identifier utilized by the second organization for the given component, and (iii) a given supplier-specific component identifier utilized by the given supplier for the given component;

determining a common component identifier for the given component based at least in part on mapping an association between the first organization-specific component identifier and the second organization-specific component identifier;

consolidating a first component order by the first organization that utilizes the first organization-specific component identifier for the given component and a second component order by the second organization that utilizes the second organization-specific component identifier for the given component into an aggregated component order that utilizes the common component identifier for the given component; and processing the aggregated component order utilizing one or more of the plurality of suppliers in the supply chain;

wherein generating the automated document parser is based at least in part on determining relative locations of one or more supplier-specific component identifiers and corresponding organization-specific component identifiers for respective ones of the one or more components in the documents exchanged as part of the fulfillment of the historical component orders for the one or more components by the given supplier; and wherein the method is performed by at least one processing device comprising a processor coupled to a memory.

19. The method of claim 18 wherein determining the relative locations of the one or more supplier-specific component identifiers and the corresponding organization-specific component identifiers for respective ones of the one or more components comprises learning a structure of the documents exchanged as part of the fulfillment of the historical component orders for the one or more components by the given supplier.

20. The method of claim 18 wherein the learned structure specifies a padding between locations of two of the supplier-specific component identifiers of the one or more components.

* * * * *